US009013283B1

(12) United States Patent
Tackaberry

(10) Patent No.: US 9,013,283 B1
(45) Date of Patent: Apr. 21, 2015

(54) SMART ELECTRICAL OUTLET, AND SMART GRID ELECTRICAL MANAGEMENT SYSTEM

(75) Inventor: Brandon Tackaberry, Minneapolis, MN (US)

(73) Assignee: Tackaberry Electronics, LLC, Minneapolis, MN (US)

(*) Notice: Subject to any disclaimer, the term of this patent is extended or adjusted under 35 U.S.C. 154(b) by 309 days.

(21) Appl. No.: 13/315,450

(22) Filed: Dec. 9, 2011

Related U.S. Application Data

(60) Provisional application No. 61/459,335, filed on Dec. 10, 2010, provisional application No. 61/460,560, filed on Jan. 3, 2011, provisional application No. 61/627,419, filed on Oct. 12, 2011, provisional application No. 61/627,420, filed on Oct. 12, 2011.

(51) Int. Cl.
*G05B 11/01* (2006.01)
*G06Q 10/08* (2012.01)
(52) U.S. Cl.
CPC ...................................... *G06Q 10/08* (2013.01)

(58) Field of Classification Search
CPC ............................ G08C 17/02; G08C 2201/91
USPC .................. 340/12.54, 12.22, 12.31, 5.1, 517
See application file for complete search history.

(56) References Cited

U.S. PATENT DOCUMENTS 7,964,989 B1 * 6/2011 Puschnigg et al. .............. 307/38
2012/0173177 A1 * 7/2012 Nishiyama et al. ............. 702/62

* cited by examiner

*Primary Examiner* — Tai T Nguyen
(74) *Attorney, Agent, or Firm* — Merchant & Gould PC

(57) ABSTRACT

A smart outlet and a smart grid electrical management system, wherein the outlet is adapted to fit in a typical gang box, to swivel, to detect and retain a plug, to automatically respond to a change in electrical demand and to provide a standby mode and includes a circuit board and an operably coupled touch screen GUI display controller, and wherein the management system includes a display controller for receiving user inputs and power data, for controlling the system and for outputting information, a ZigBee enabled load controller and a wired or wireless communication network linking the display controller, the load controller and one or more outlets, power sources, and/or electrical appliances or devices.

12 Claims, 32 Drawing Sheets

FIG. 14
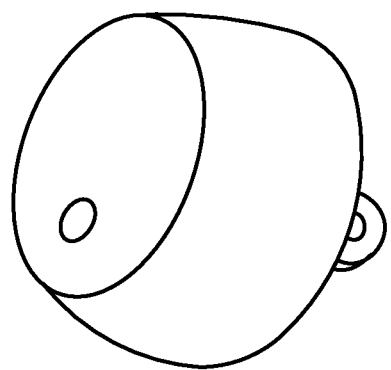
FIG. 15
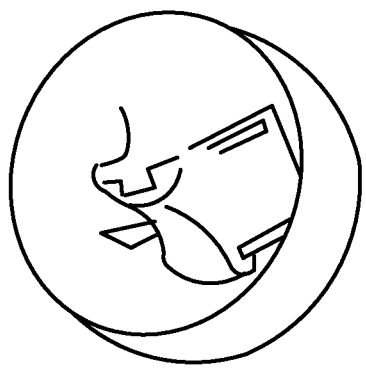
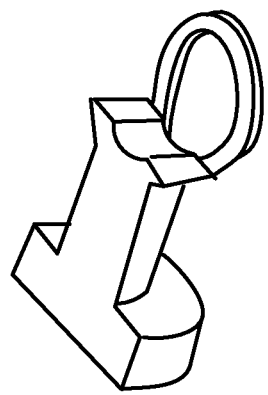
FIG. 16
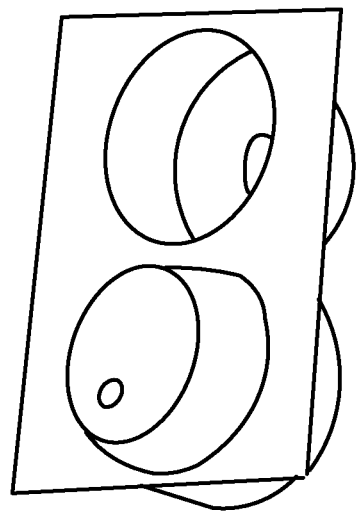
FIG. 17

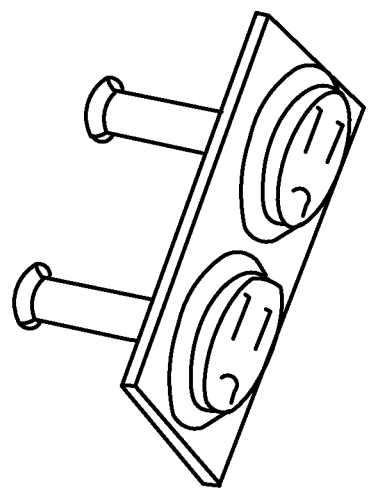
FIG. 18
FIG. 19
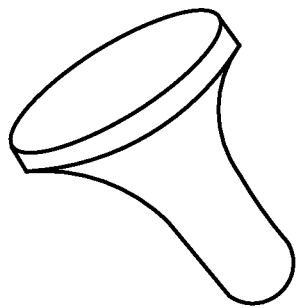
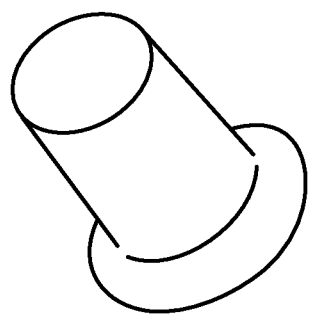
FIG. 20

SMART ELECTRICAL OUTLET, AND SMART GRID ELECTRICAL MANAGEMENT SYSTEM

CROSS-REFERENCE TO RELATED APPLICATIONS

This application claims priority to U.S. Provisional Patent Applications 61/459,335, filed Dec. 12, 2010; 61/460,560, filed Jan. 3, 2011; 61/627,419, filed Oct. 12, 2011; and 61/627,420, filed Oct. 12, 2011, the entire contents of all of which are hereby incorporated by reference.

BACKGROUND

The present application relates to electrical outlets and electrical grid systems. Known electrical plug-receiving sockets or outlets with two vertical parallel blade openings and a ground pin hole have remained largely unchanged since originated, and lack modern safety and power saving features. Another problem is the simple unmonitored and/or uncontrolled connectivity provided by known outlets. For example, many appliances use significant amounts of power when plugged in, even when not in use, e.g. audio systems, televisions, computers, chargers, etc. As technology becomes more and more of a part of our lives, the power we consume because of technology also goes up, making it more and more difficult for power companies to supply enough energy at peak hours. As it stands, the commonly known outlet has no functionality for power control, and it would be helpful if, via finer degree of control and increased awareness, peak load and overall usage could be reduced to a more manageable level. Power monitoring and wireless reporting solutions have not been built into outlet units permanently mounted in the wall. In-wall and out-of-wall child safety designs are easily defeated or hard to use and none can actually cut power to an outlet. In summary, known outlets and grid systems are not optimally functional, and could be improved to improve usefulness, as well as environmental friendliness, health and safety.

SUMMARY

As used herein, any reference to "the invention" or "the present invention" in this application shall not be construed as a generalization, limitation or characterization of any subject matter disclosed herein and shall not be considered to be an element or limitation of the appended claims except if and/or where explicitly recited in a claim(s).

In one embodiment, the present invention comprises a smart electrical outlet adapted to fit in a typical gang box, to swivel, to detect and retain a plug, to automatically respond to a change in electrical demand and to provide a standby mode, the outlet comprising a swiveling plug receptacle, a plug detection system, a retention system and a circuit board, and operably coupled to a touch screen GUI display controller.

In one embodiment, an outlet in accordance with the present invention is a mesh-connected, safety conscious outlet capable of monitoring, reporting and controlling energy usage, having mechanical functionality for plug detection and retention, and having the ability for each plug receiving receptacle to swivel. In some embodiments, the outlet is designed to fit into a NEC rated double gang electrical box and, in some embodiments, into a single gang box. The present invention also encompasses an "outlet cover" embodiment implementing all the functionality of a smart outlet in accordance with the present invention by plugging into, fitting over and screwing to an existing known outlet.

In one embodiment, the present invention comprises a grid management system comprising one or more electrical outlets and/or one or more smart electrical outlets comprising a swiveling plug face, a retention system, a circuit board and a touch screen GUI display controller, a display controller for receiving user inputs and power data, for controlling the system and for outputting information, a ZigBee enabled load controller and a wired or wireless communication network linking the display controller, the load controller and one or more outlets and/or smart outlets, power sources and/or electrical appliances or devices.

In some embodiments, the present invention comprises a smart outlet and a smart electrical grid management system, wherein the outlet is adapted to fit in a typical gang box, to swivel, to detect and retain a plug, to automatically respond to a change in electrical demand and to provide a standby mode, and includes a circuit board and a touch screen GUI display controller, and wherein the management system includes a display controller for receiving user inputs and power data, for controlling the system and for outputting information, a ZigBee enabled load controller and a wired or wireless communication network linking the display controller, the load controller and one or more outlets, power sources, and/or electrical appliances or devices.

In some embodiments, an outlet in accordance with the present invention will be connected to any other outlet in a network in accordance with the present invention and/or "a digital display controller", a personal computer and/or a remote control in the system, which control and communicate graphical user interface ("GUI") features and programmability features with a user. The communication may take place via ZigBee radio frequency networking, Home Area Networking, infrared communications and/or other interoperability communications standard(s) and/or protocols, as well as non-interoperability communications, and/or open source networks. In some embodiments, the ZigBee mesh connected outlets can be controlled either by a digital display controller, and/or remote control communicating through ZigBee RF communications, or a "Mother" called network transceiver USB module which lets the PC communicate through ZigBee connecting to a computer and allowing the created mesh network to connect to the Cloud, and/or internet based web server, and/or other online internet storage location. This allows user control from a remote device, e.g. a display controller, personal computer, an Internet based interface, etc., whereby a user can monitor and control energy usage throughout a house or building from anywhere with an internet connection. The GUI allows a user to control any number of outlets in their home or elsewhere. It allows a user to turn on or off outlets specifically or by the group, as well as set up timers. It will also enable monitoring and reporting energy usage. The GUI, as well as suitable computer software in accordance with the present invention, allows users to control and manage smart outlets, appliances, standby power loss, and utility identifiable peak power energy usage times.

In one aspect of the present invention, to save energy and money, a smart grid electrical management system in accordance with the present invention can be used to turn off outlets to reduce energy consumption and reduce or eliminate phantom power loss. In some embodiments, the outlets can be shut off automatically, directly from a display interface, or by a sensed demand and/or demand response. In some embodiments, the system has two sections, an outlet board and a display board, as well as hardware, firmware and software enabling communication between the two sections.

In some embodiments, a display board in accordance with the present invention acts as a user interface having a guided user interface to lead a user through rooms, outlets, plugs and/or appliances in a home or office. In some embodiments, once one of these is chosen, the display lists choices on screen, e.g. turn on, turn off, demand response, or standby reduction. The on and off are choices wherein the user can physically turn an outlet on or off. The demand response looks at real time pricing through a suitable connected Wi-Fi adapter, and then compares the pricing to a user defined threshold. If the price is higher than the threshold a display controller sends a command to the selected or necessary outlets to turn off. The standby reduction choice displays current status of an outlet, e.g. whether the outlet is on or off, and/or its current power consumption. If an outlet's state needs to be changed, the display sends the command through a suitable wireless RF device, e.g. a ZigBee device. The display and outlet both contain a ZigBee chip, i.e. ZigBee capability.

In some embodiments, an outlet in accordance with the present invention comprises built-in relays so when a command is received the state of the outlet can be changed. In some embodiments, after being changed, the outlet will send confirmation in two ways: it will send a packet back to the display controller and a screen will show "Top Plug On/Off" and an LED or LEDs on the outlet will shine green for on and red for off. In some embodiments, when a standby reduction command is received, an outlet will send its current state and power consumption back to the display controller. The power consumption may be monitored by suitable energy metering ICs, and the metering ICs may store data on a low power MCU on the outlet board.

In some embodiments, an outlet in accordance with the present invention comprises safety features, e.g. a plug detection system which will not allow an outlet to turn on unless both prongs of a plug are plugged in at the same time. In one embodiment, the safety features may comprise photo detection and relays to allow power to flow out of the outlet.

In some embodiments, although ZigBee capability creates a mesh network, a stronger processor may be used, e.g. when adding more nodes for a home or office application. In some embodiments, integrating lighting control may also help an end user save money and energy, and an application for smart phones may be provided for, as well as remote access to the system for full remote control, monitoring and/or operation of the system.

In some preferred embodiments, a smart outlet and use thereof in accordance with the present invention comprises at least the following features and/or functions: plug detection (2 or 3 prong), plug retention, rotating and swiveling plug-receiving module(s), communication capability, monitoring hardware, power supply, power control and system failure fallback.

Plug detection provides safety and control over the outlet, preventing electrical shocks in the event something conductive is inserted into one of the prong slots. In some embodiments, detection may be accomplished and/or comprise detecting an individual plug prong in the outlet through the use of mechanicals switches or buttons. The buttons can be plastic, cylinder shaped objects. In some embodiments, an outlet in accordance with the present invention will feature two, or in some cases of a grounded outlet applications, or 3 buttons per socket. These two or three buttons located in each of the three slots per socket may be incorporated into a swivel module, and this acts as the interface between all grounded and ungrounded plugs and the outlet, and facilitates retention using a spring loaded toggle feature. The blade prongs of the plug will independently push on these buttons moving them within the outlet. The movement of the buttons will be detected by a microcontroller which is an integrated circuit located on a board inside the outlet sleeve, which will then measure that time span between each button that is pushed and provide a simple electro-mechanical solution to detect a plug. Separate buttons will also allow the outlet to track the time interval in which each are pressed. A normal plug will press both buttons within a very small window of time. If this is not the case, as with inserting different foreign objects at even slightly different times, the outlet will distinguish these and not supply power to the prongs. These features will greatly increase the level of tamper resistance, which current outlets are simply not able to supply. The plug detection feature will also distinguish between a two or three prong device. Once a valid device is detected, the system will supply power and illuminate a light or LED(s) associated with the outlet, signaling to the user that the outlet is in operation.

In some embodiments, plug detection may be provided by replacing mechanical buttons or switches with purely electrical devices, whereby a control feature allows the outlet to be turned on or shut off when both prongs of an outlet (line and neutral) are detected simultaneously. Sensors are placed in the outlet near or at the ends of prongs to ensure proper seating of the outlet plug prior to activation of power. The circuit detects when a plug has been inserted into the socket and tells the whole system to power on. Otherwise, the outlet will remain power off. For example, in some embodiments, the plug detection algorithm is controlled by a MSP430 processor. There are four general purpose I/O pins connected to two phototransistor circuits. When the phototransistors turn on the outputs will be detected high. The MSP430 firmware will send a signal to the relay powering the plug and will turn it off. A 16 bit hardware timer was used to track how long the plug's prong has been turned on. The algorithm starts by detecting an edge triggered interrupt on the input pin of the phototransistor circuit. Once this occurs 100 ms is counted down by the hardware timer and then the processor proceeds to check the other prong. If the other prong is detected then the outlet will turn on. However, if the other prong is not detected the outlet will stay off. This will prevent a potential electrical hazard. Other embodiments may comprise low power LEDs and Schmidt trigger photo resistors placed opposite each other, wherein an inserted prong will be between them. When the light is blocked the microcontroller will activate the main power supply relay.

In some embodiments, plug retention may be accomplished and/or comprise retaining an electrical plug with greater force than current standard outlets. This will be accomplished through the use of retention clips and a plastic piece that pushes against the clips as the plug slides forward in the normal button face (toggle) operation, or to hold the prongs of an electrical plug in the outlet until the required force to remove the plug is applied. In some embodiments, the retention feature operates in concert with the plug-in toggle operation. The socket face starts out in a slightly forward position. The user pushes it in slightly when plugging their device in. The socket face then pops forward. In the same motion, an internal piece attached to the socket face pinches the plug prong clips, closing down on the prongs and thus providing retaining force. In some embodiments, the forward state also is the only time electricity is supplied to the device. The clip prongs are made from conductive metal, shaped with a slope on the side, allowing the pinching piece area of contact to apply the holding force. To release a plug, a user simply pushes forward on it and/or the socket face. This brings the internal mechanism back to its original position. As the socket module slides backward, the piece pinching the plug clips slides off, releasing the extra force on the plug prongs. This also deactivates the power from that socket. The user then removes the loosely held plug from the outlet.

In some embodiments, plug receiving module rotation may be accomplished and/or comprise the use of a universal bearing sphere and a bracket that mounts the socket module to the case which has a mating spherical cavity which gives freedom of movement in any direction. This will allow an individual plug-receiving outlet receptacle to rotate and return to its originally aligned position. The ability of the outlet to rotate will help prevent the prongs of the plug from bending because when a device is plugged in to the smart outlet. In some embodiments, the plug receptacles also have vertical and lateral freedom to swivel. The modules may be constrained from excessive movement, e.g. rotation in the clockwise or counterclockwise direction, to protect the inner wiring of the outlet. In some embodiments, there is a re-centering mechanism comprised of four leaf springs attached to the socket module; other embodiments may use a coil spring. This provides increasing resistance as a plugged in cord is pulled further to the side and returns it to its original, central position when the external force is released.

In some embodiments, communication capability may be accomplished and/or comprise using ZigBee protocol and the IEEE802.15.4 standard. For example, in some embodiments, a system will run on the ZigBee/HomePlug Smart Energy Profile, and/or OpenHan. ZigBee may be used because it is a pre-existing mesh networking protocol. In a mesh network, any given node can use any other node to form a path to its destination. By operating outlets on their own network, the possibility that any given wireless technology will cause the outlet to become obsolete is reduced or eliminated. The network can be connected to the modern internet, or whatever available communications technology exists, or will exist in the future, through one connection point or node. Changing the connectivity technology between the outlet network and the greater internet is then as simple as changing one node. This connection node may be known as the "Mother," a called network transceiver USB module, which lets the PC communicate through ZigBee connecting to a computer and allowing the created mesh network to connect to the cloud, and/or an internet based web server, and/or other online, information storage location. In some embodiments, an outlet can be easily installed and the system scaled. Each outlet communicates with one another using the mesh network. This means there are no new data cables or power wires to run when new outlets are added. As long as the installed outlet is within approximately 100 feet of another outlet, it simply joins the outlet network in the home or other building. This defeats any scalability issue, opening systems in accordance with the present invention a wider target audience. A corporate client that can easily afford a large initial investment in a multi-outlet system can take advantage of the system, as well as a frugal home-owner who would like to start with two or three smart outlets and build up the smart outlet network over time. In some embodiments, the minimum amount of outlets required to use the system of the present invention is one and the maximum amount is governed by the meshing address size, 2^16 (65,536).

In some embodiments, monitoring may be accomplished and/or comprise measuring the instantaneous voltage and current for monitoring and standby detection services. The current will be measured via the voltage drop across a very small known resistance. The voltage will be measured across the smaller of two large resistors in parallel. The ratio between the two will be great enough that the peak voltage typically seen in a cycle will be reduced to within 0-3V range. To meet the desired functionality the system or a meter component thereof must translate large voltages and currents into the small range the system microcontroller's analog-to-digital converter will accept with minimal parasitic loss (Ploss=V/Rvs2+Iris2 per outlet). This parasitic loss will be minimized when the current sensing resistance is very small, perhaps a thick section of wire and the voltage divider equivalent resistance is great, 100 kOhms or higher. This solves the parasitic loss issue but the voltage measure from the current sense resistance may be too small to accurately measure standby power use. Furthermore, there is no isolation from current spikes if the microcontroller unit) measures this directly and the large input resistances presented by the voltage divider to the analog/digital converter can hinder conversion time. To address these issues, in some embodiments an operational amplifier will be placed between the raw voltages and the microcontroller, amplifying voltage from the current sense resistance and buffering the voltage sense voltage to improve analog/digital conversion speed. This will also clip the measured voltage and current signals seen by the microcontroller protecting it from overvoltage. In some embodiments, amplifier uses the same voltage for power as other components. In some embodiments, the microcontroller should be able to support as many as six analog/digital channels when both outlets are in use. Power should be measured to within 10 mW accuracy. Maximum power may be as high as 2,400 W and this must be measured correctly as well. This precision may be created in software through time averaging of many periods. The amount of samples of the voltage and current per second is large; once per cycle may be insufficient because voltage and current of an AC system can vary in phase, frequency may change and non-linear loads may create distorted current waveforms. In some embodiments, 6 KHz will be the starting point for both current and voltage sampling rate. When both outlets are on, and voltage is measured separately per outlet and current is measured on both neutral and hot to provide ground fault detection, this equates to 36,000 analog/digital conversions per second. Allowing 27 uS for each conversion. If fewer channels prove satisfactory the maximum available conversion time would increase. After the analog signals are converted to digital values representing voltage and current, power will be computed through hardware multiplication of the corresponding voltage and current samples. These instantaneous power readings will be squared, summed, divided by the number of samples (e.g. an interval of the waveform period) and finally the square root taken before being stored as the root mean square ("RMS") power for that interval. The RMS procedure will also be done on current and voltage data separately to find Vrms and Irms. The RMS power divided by both Vrms and Irms equals the power factor; the product of these two is the apparent power. Frequency can be calculated by finding the average delay between voltage peaks and troughs over an interval.

In some embodiments, power supply will be small, isolated, and supply at least 40 mA at 12V and at least 100 mA at 2.51V. This may be accomplished and/or comprise a fly back transformer with an offline switcher to lower the voltage and provide isolation, while a bridge rectifier with a capacitor will convert it to DC. The power supply provides high efficiency power and should use 100 mill watts with no loading.

In some embodiments, power control may be accomplished and/or comprise using an AC switch to safely and effectively turn on and off the AC power supply to each individual outlet in an enclosure. In some embodiments, the physical disconnect of the AC supply may be implemented with two power relays. To meet the desired functionality of the AC switch the power relay should be able to operate in temperature range from −40° to 85° C. and be properly insulated to meet UL's specifications in the United States and Canada, and other countries specifications as needed. The physical size of the power relay should be small enough to fit into the box enclosure and should be capable of being mounted on a printed circuit board. The power relay may have a minimum power rating of 2400 VA so that it could be used in a 15 A or 20 A branch circuit. To ensure safe switching of the AC power supply, the contacts of the power relay may have a minimum continuous current rating of 16 A and a minimum voltage rating of 240 VAC. The contacts in the power relay may also have a minimum switching voltage rating of 240 VAC. The power relay may have two bi-stable coils to meet the desired functionality of the AC switch. There may be three through hole terminals on the power relay, one terminal for the DC power input and the other two terminals to set and reset the contacts. The input voltage of the actuating system may be in the range of 3 to 24 VDC and the coil power rating may be less than 1 W to be compatible with the outlet power supply. The power relay contact configuration may be single pole double throw with coil latching to minimize the power consumption and heat dissipation. The power relay may not draw more than 5 mA from the power supply and may have a switching time from 0.5 to 1 second. In the relay circuit diagram (FIG. 28) a resistor is placed before the positive terminal to limit the current to the power relay. A capacitor may be connected in parallel with the limiting resistor to supply the instantaneous voltage needed to achieve the desired switching time. Placing a diode before the resistor will prevent the capacitor from discharging while the coil is not energized. Two transistors can be used to switch the current to the set and reset pins on the relay.

In some embodiments, system failure fallback may be accomplished and/or comprise a small circuit to enable mains power to be reconnected to the outlet permanently. This is more desirable than mains power being disconnected after a system failure, as the outlet would no longer usable. The circuit will use an inverter to drive the transistors normally used for reconnecting power. This inverter will have a capacitor across it so that in the event of a power supply failure the circuit will still activate the reconnect of a relay circuit. In the case of a microcontroller failure, a mono stable multi vibrator will trigger the relay transistors to reconnect the power.

BRIEF DESCRIPTION OF THE DRAWINGS

FIGS. 14-17 depict an alternative embodiment for providing for a swivelling plug receptacle in accordance with the present invention.

FIGS. 18-20 depict another alternative embodiment for providing for a swivelling plug receptacle in accordance with the present invention.

DETAILED DESCRIPTION

With regard to fastening, mounting, attaching or connecting components of the present invention, unless specifically described as otherwise, suitable mechanical fasteners and methods may be used. Other appropriate fastening or attachment methods include adhesives, welding and soldering, the latter particularly with regard to the electrical system(s) of the invention. Suitable electrical components and circuitry, wires, wireless components, chips, boards, microprocessors, inputs, outputs, displays, control components, etc. may be used. Generally, unless otherwise indicated, the materials for making embodiments of the invention and/or components thereof may be selected from appropriate materials such as metal, metallic alloys, ceramics, plastics, etc. Unless otherwise indicated specifically or by context, positional terms (e.g., up, down, front, rear, distal, proximal, etc.) are descriptive not limiting. Same reference numbers are used to denote same parts or components.

Figure 1:
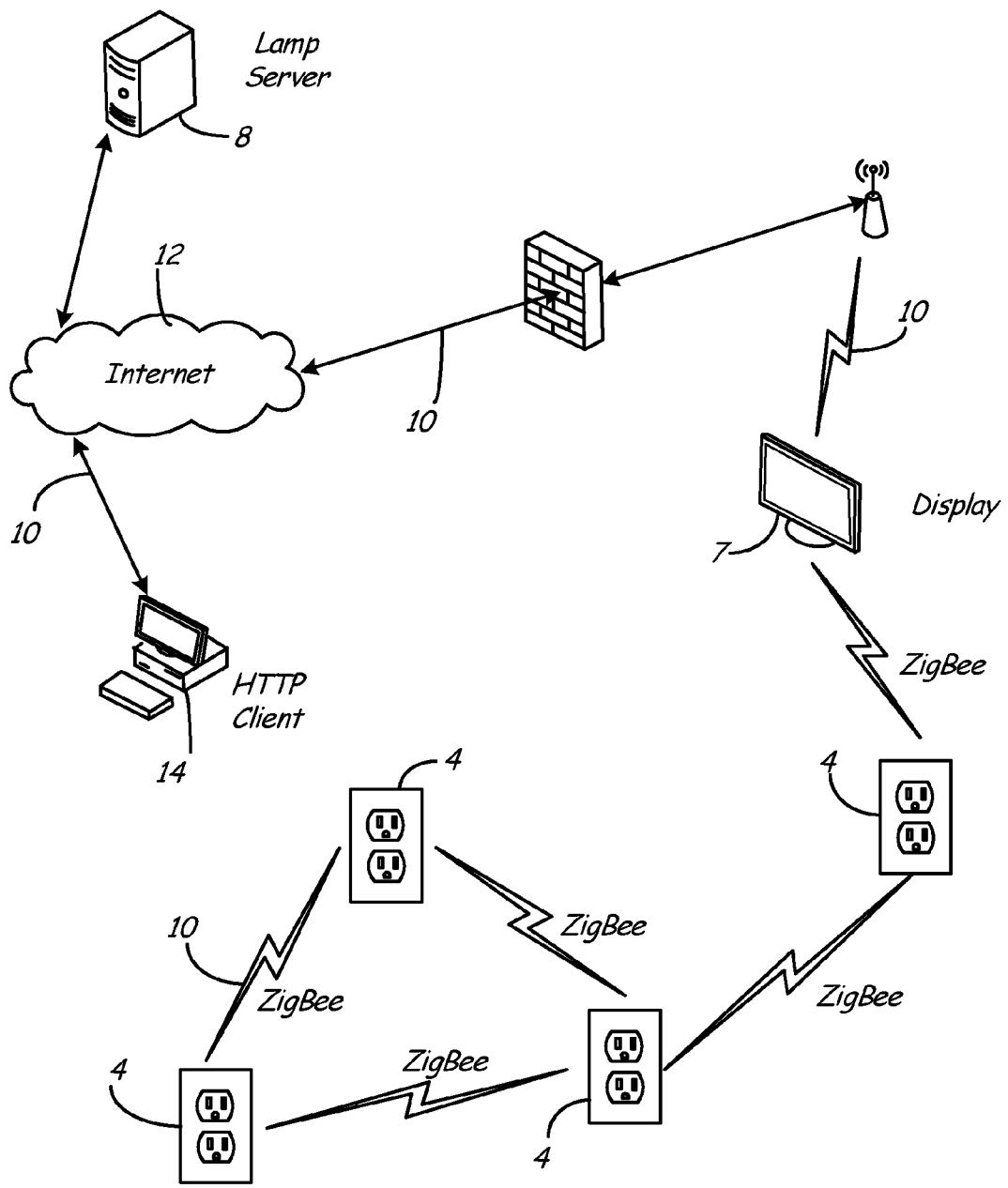
FIG. 1 depicts an embodiment of a smart electrical grid system in accordance with the present invention.

FIG. 1 depicts an embodiment of a smart electrical grid management system in accordance with the present invention. The system comprises a number of outlets 4, a ZigBee/Wi-Fi enabled display controller 7 for receiving user inputs and power data, for controlling the system and for outputting information (which also may be referred to and/or thought of a load controller (see FIG. 35)), and a server 8. A communication network or communication among the devices comprising the system is depicted by communication lines 10, and may be conducted via the internet, represented at 12. The system may include one or more personal computer type devices 14.

Figure 2:
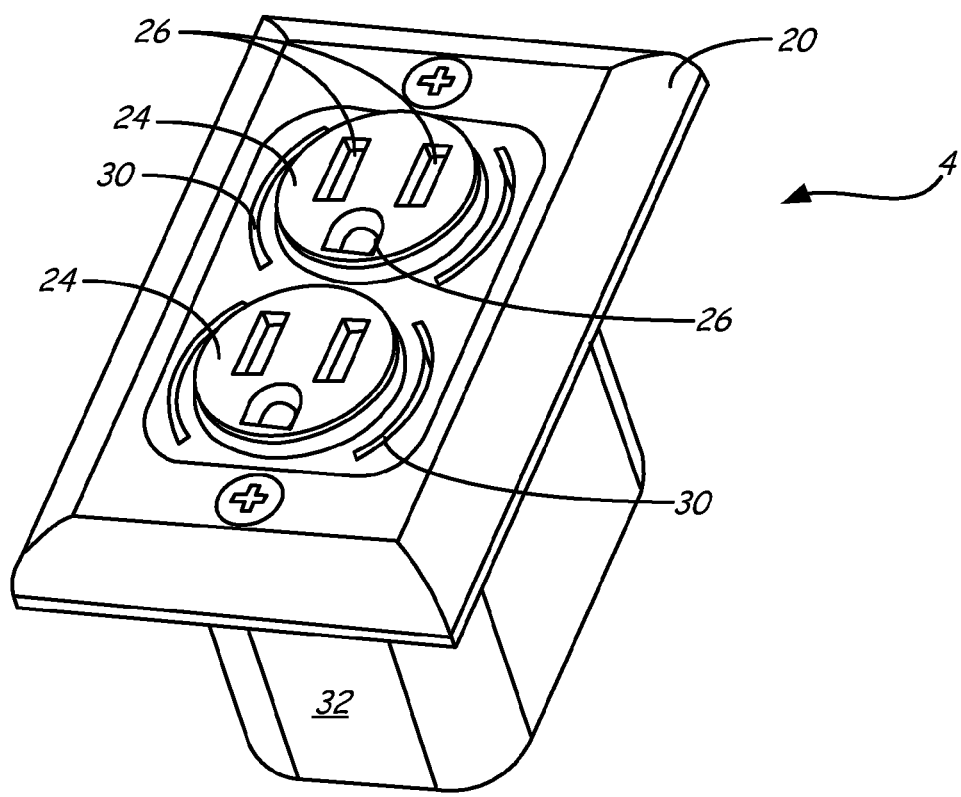
FIG. 2 depicts an embodiment of a smart electrical outlet in accordance with the present invention.

One embodiment of a smart outlet 4 in accordance with the present invention is depicted in FIGS. 2-6. Referring to FIG. 2, the exterior, outwardly facing portion of the outlet comprises a face plate 20 generally surrounding two plug receptacles 24, each having openings 26 for three prongs, two blades and a ground prong, as is customary in the United States. The face plate includes four arcuate LEDs or LED apertures or lens 30, a pair for each plug receptacle 24, for providing visual operating and/or monitoring information to a user. Other configurations of the receptacles 24 for receiving different styles or types of plugs are possible, e.g. European style plugs. The face plate 20 is mounted to a generally rectangular box-like sleeve housing or case 32 by two screws.

Figure 3:
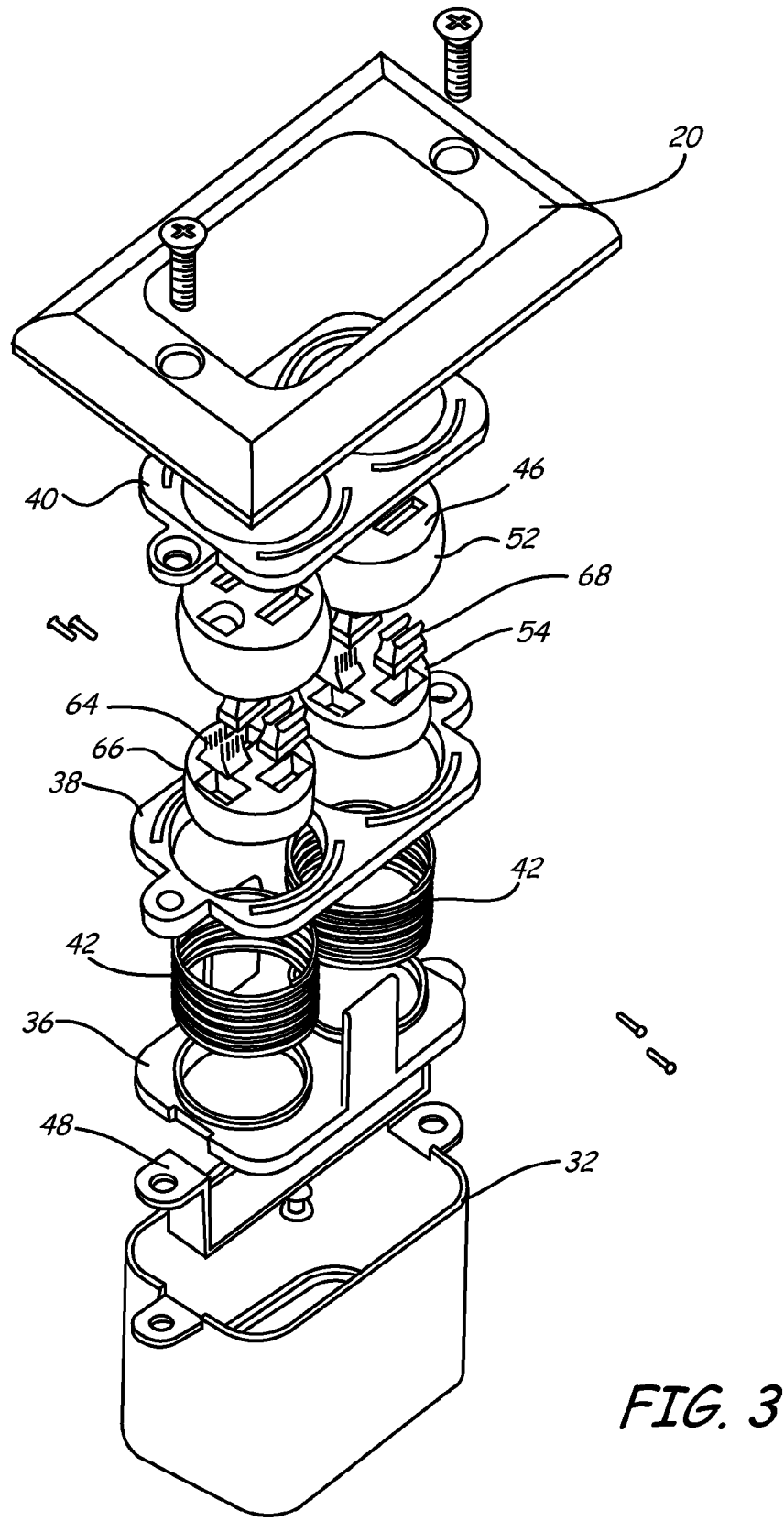
FIG. 3 is an exploded perspective of an embodiment of an electrical outlet in accordance with the present invention.
Figure 4:
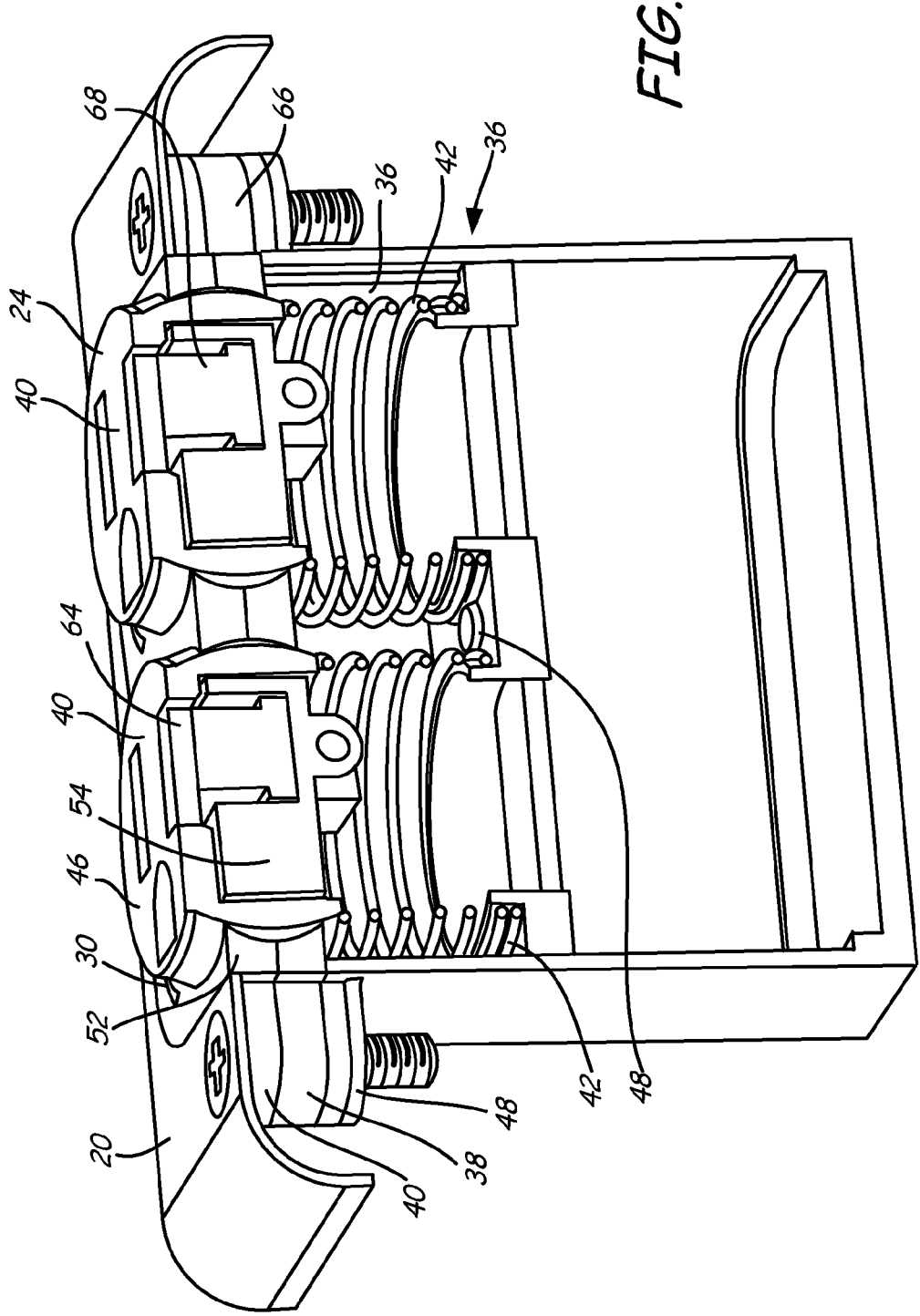
FIG. 4 is a sectional perspective of the outlet of FIG. 3.
Figure 5:
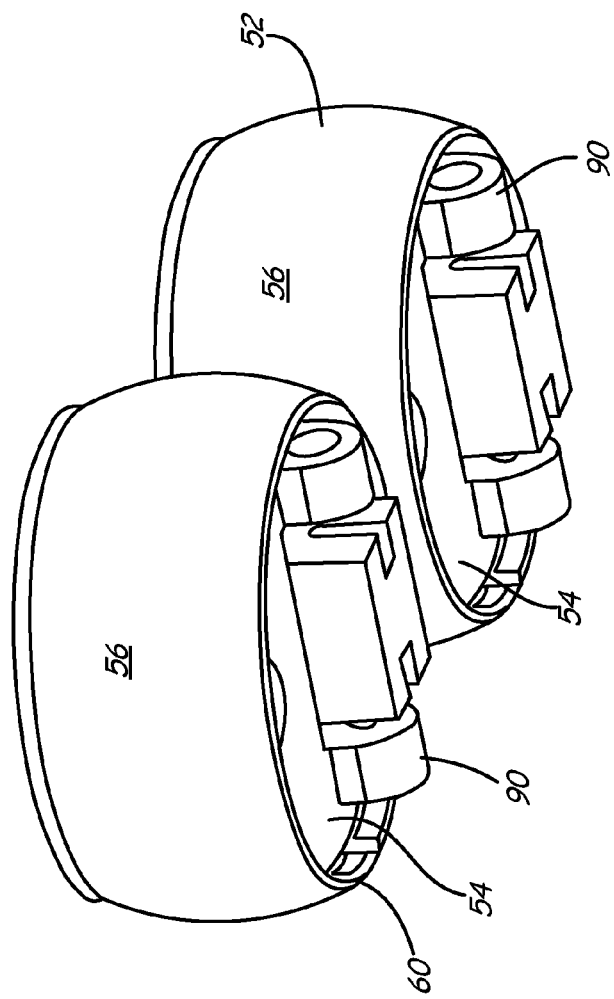
FIG. 5 is a perspective view of an embodiment of a bearing component of an outlet in accordance with the present invention.
Figure 6:
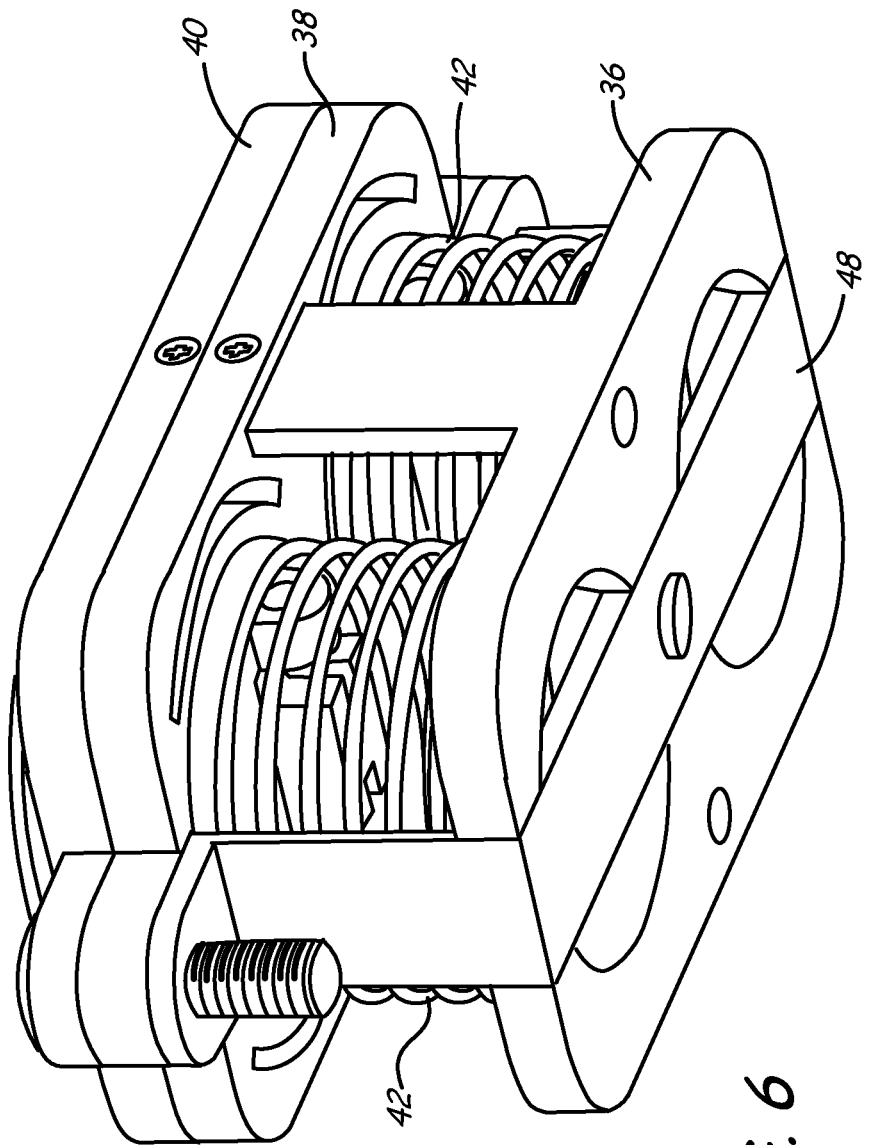
FIG. 6 is a perspective view of the outlet of FIG. 3.
Figure 7:
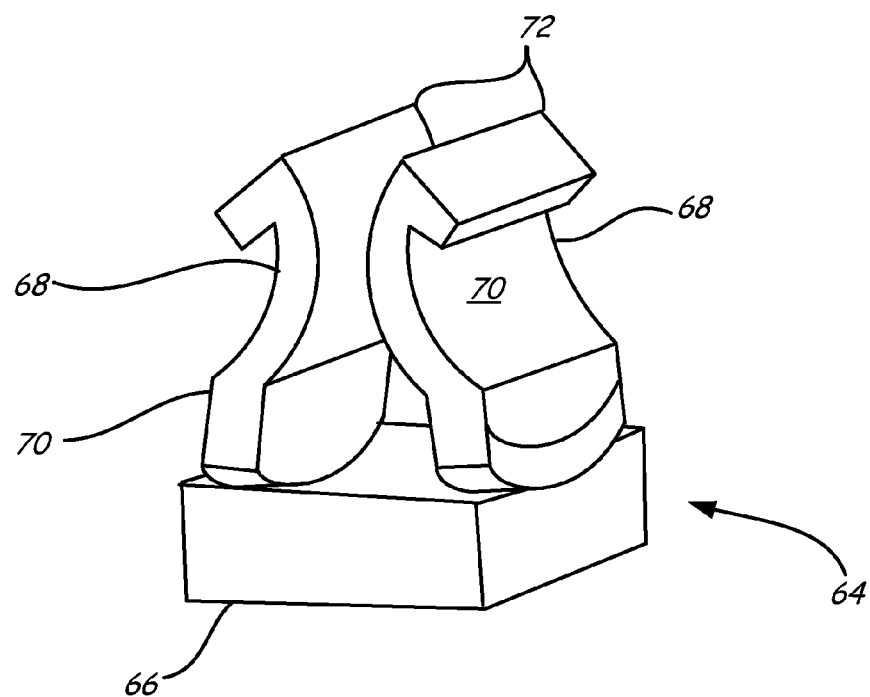
FIGS. 7-10 depict embodiments of plug retainers/retaining in accordance with the present invention.

FIG. 3 is an exploded perspective view of an outlet in accordance with the present invention, and FIGS. 4-6 are sectional and/or perspective views depicting further details of the outlet. As can be appreciated from FIG. 3, the case 32 and face plate 20 enclose a space for receiving internal components of an outlet in accordance with the present invention. The space is adapted for receiving suitable circuitry, electronic components, circuit boards, chips, etc., as well structural and functional supporting and operational components. With reference to FIGS. 3 and 4, internal structural components of the outlet, which generally fit inside the case, include a recentering frame 36, a bottom holder bearing frame member 38 and a top holder bearing frame member 40 for receiving and holding a recentering coil spring 42 for each plug receptacle 24. The frame 36 further comprises a supporting steel skeleton frame member 48. Each recentering spring 42 nests between the holders 38, 40, and provides centering and recentering of the respective plug receptacles 24, a degree of linear give for compensating for the force exerted when inserting a plug, controlled swiveling or tilt, and/or keeps the receptacle faces 46 level and centered. It should be appreciated one or more of these functions, e.g. controlled rotation, could be provided by or augmented by other suitable mechanisms, e.g. a spring-loaded ratchet like arrangement.

With continued reference to the Figs., including FIGS. 3-6, the outlet includes a bearing assembly held by upper and lower bearing frames 38, 40, which capture and guide a bearing casing 52 and bearing component 54. As can be seen in FIG. 5, the bearing casing 52 has a curved bearing surface 56 captured, guided and supported by the bearing frames. The bearing components 54, which can also be referred to and/or thought of as retainer blocks, provides the face 46 of the plug receptacles and may carry additional supporting structures and/or features on their underside. The depicted, exemplary bearing assembly may be thought of and/or referred to as a "ball and socket" type bearing assembly. An internal, circular edge 60 of the bearing casings 52 rests on the springs 42. When assembled, as shown in FIGS. 4 and 6 and mounted in the case 32, the bearing assembly enables each plug receptacle 24 to tilt and/or swivel to a selected degree, to rotate a selected degree, e.g. 180 degrees or more or less than 180 degrees, both clockwise and counterclockwise, and to return to level and center if deflected.

Figure 8:
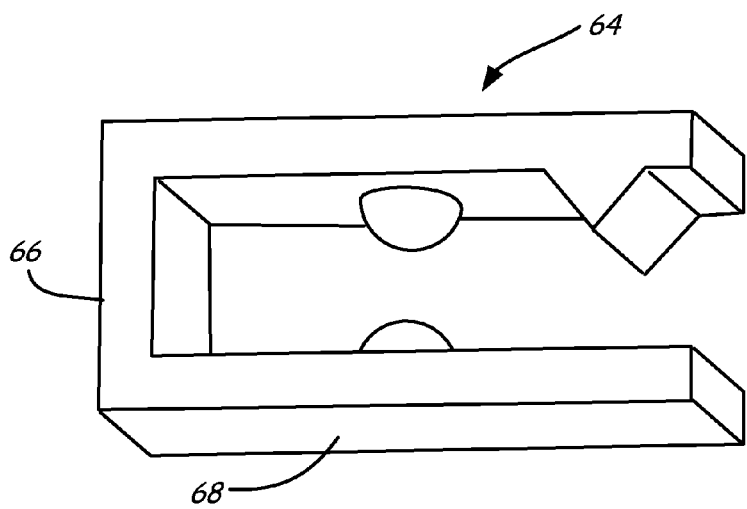
Figure 9:
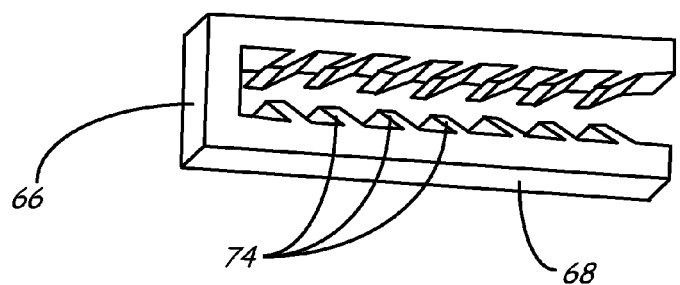
Figure 10:
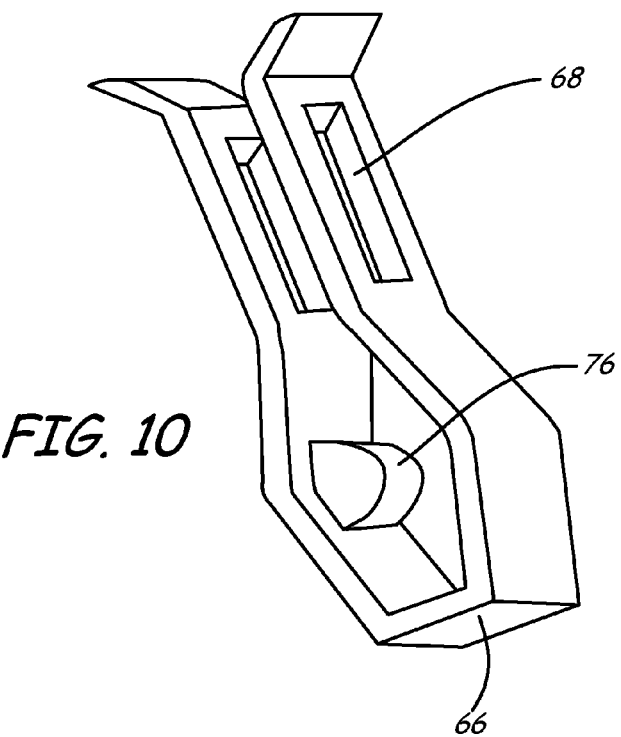

Referring to FIGS. 3, 4 and 7-10, plug retention is provided by retainer clips 64, which may be made of brass or other suitable material. The clips 64 are provided for contacting and gripping plug prongs and are fitted in, supported by and held by the retainer block bearing component 54. The clips 64 are generally U-shaped, comprising a base 66 and a pair of resilient arms 68 for frictionally gripping the sides of a typical plug prong. In one embodiment (FIGS. 3, 4 and 7), the arms 68 include a curved central portion 70, narrowing inwardly, to grip the sides of a typical prong. The ends 72 of the arms 68 curve outwardly to create a receiving space. FIGS. 8-10 depict alternative designs for retainers for retaining a plug including a pinching design (FIG. 8), a brush design with each arm 68 carrying a series of brushes 74 (FIG. 9) and a design that makes use of a pinching effect and a projection 76 for being received, at least in part, by the typical plug prong hole (FIG. 10).

Figure 11:
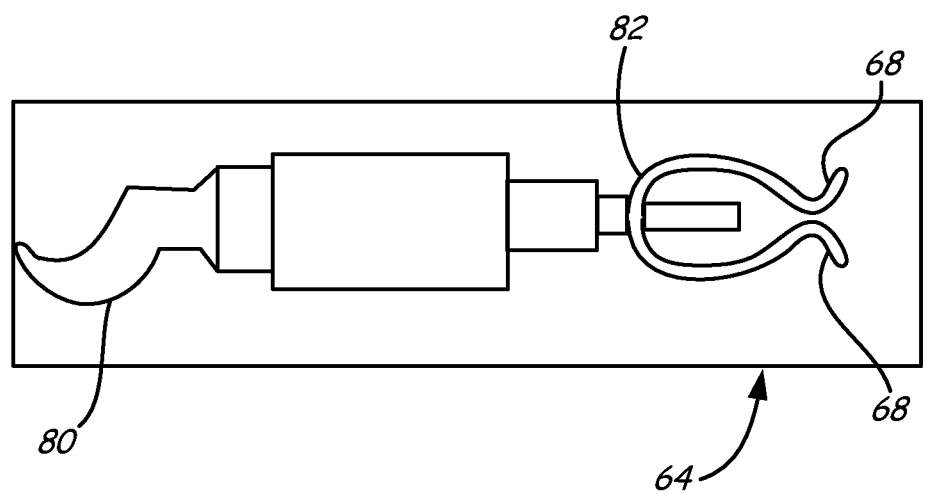
FIGS. 11-13 depict embodiments of plug detectors/detection in accordance with the present invention.
Figure 12:
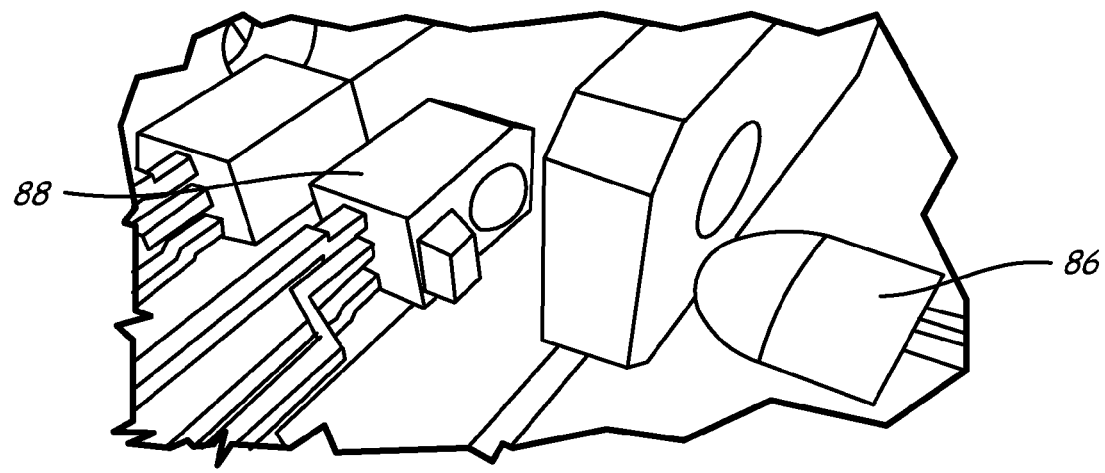
Figure 13:
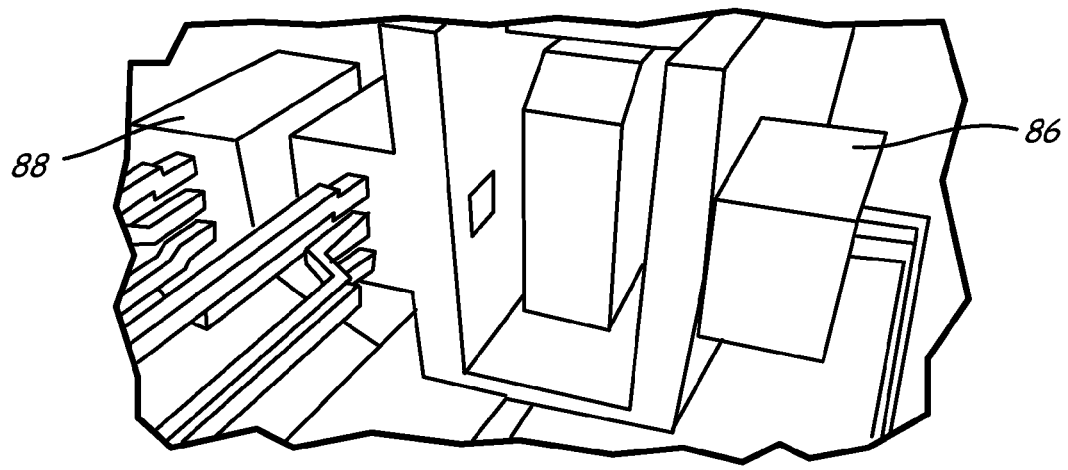

Referring to FIGS. 11-13, an outlet in accordance with the present invention includes a plug detection function and features enabling the detection of proper insertion of a plug and/or insertion of something other than a proper plug. FIG. 11 depicts one possible embodiment wherein detection is provided by a switch 80 including an pin 82 which is displaced as a plug is inserted between the arms 68. Another possibility is that one or more of the brushes 74 of the retainer depicted in FIG. 9 may be adapted to be deflected outwardly as a plug is inserted to signal the inward movement of a plug. FIGS. 12 and 13 depict an electronic design for plug detection using, for example, an LED 86 and a photo sensor 88, wherein they are positioned adjacent to a retainer clip to detect the inward movement of a plug prong. This electronic sensing embodiment may comprise the use of Schmitt triggers or other suitable devices. FIG. 5 shows one embodiment of a supporting structure 90 carried by the bearing components for supporting the LEDs and photo sensors. They may be otherwise suitably located as well.

FIGS. 14-20 depict alternative embodiments for providing for the swivel and/or tilting movement of the plug receptacles in accordance with the present invention. FIGS. 14-17 depict a universal joint type gyro-rod design wherein the center of rotation is moved to the bottom of a middle support piece attached to the bearing/plug face component. In one embodiment, it exhibits two degrees of freedom, but this may be varied. FIGS. 18-20 depict a joystick design wherein the center of rotation is shifted back to where the top piece meets the base. It has rotation as well as swiveling capacity. The area around the plug face may be sealed by a skirt (not shown) so no particles or other material could enter the outlet from the sides of the plug faces. The top and bottom pieces (FIGS. 19 and 20, respectively) would be connected by a spring or spring-like piece to enable recentering and restrain swiveling to the desired degree. In a further variant, the bottom could be modeled to come from the side of the sleeve instead of from the bottom.

Figure 21:
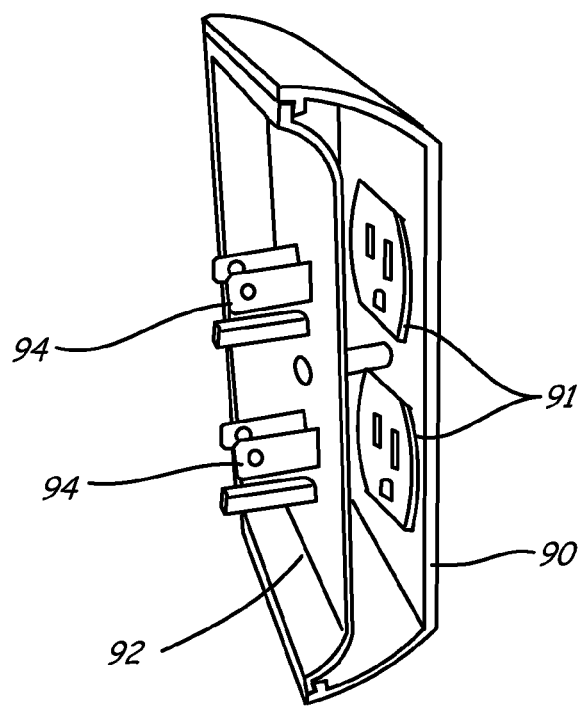
FIGS. 21 and 22 depict an embodiment of an outlet in accordance with the present invention, wherein the outlet comprises a smart adapter for use with a conventional electrical outlet.
Figure 22:
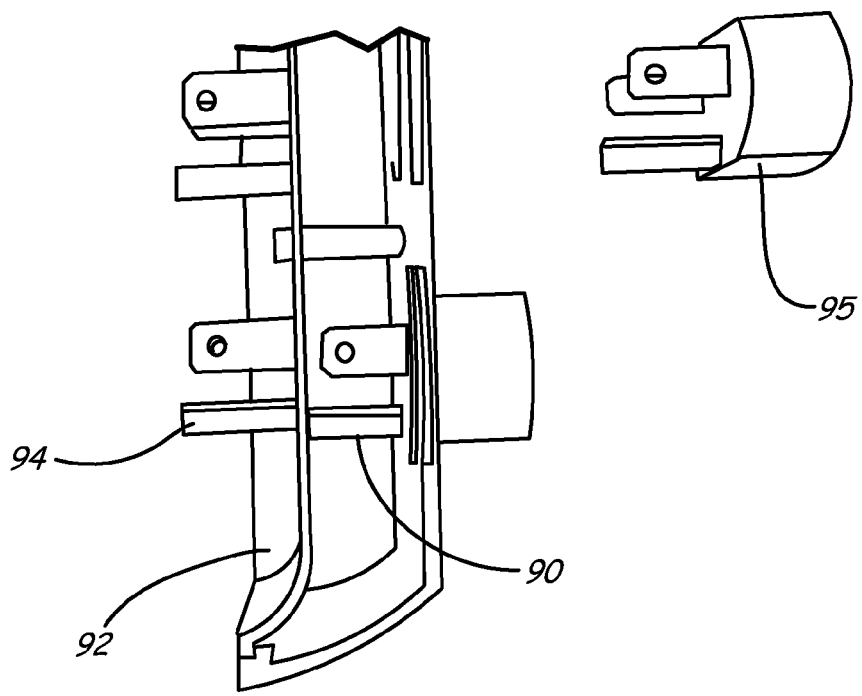

FIGS. 21 and 22 depict a mating cover embodiment of an outlet in accordance with the present invention wherein an exterior cover half 90, with indicator lenses 91, is mated to an interior cover half 92. The interior cover half carries typical prongs 94 for being received in a common wall outlet (not shown). When joined as shown in FIG. 21, the two cover halves create a space for receiving electronic components, circuit boards, etc., for accomplishing the objectives of a smart outlet in accordance with the present invention. FIG. 22 depicts the orientation of a customary plug 95 relative to being received by the mating cover embodiment of the present invention.

Electronics of Smart Outlet 4.

Figure 23:
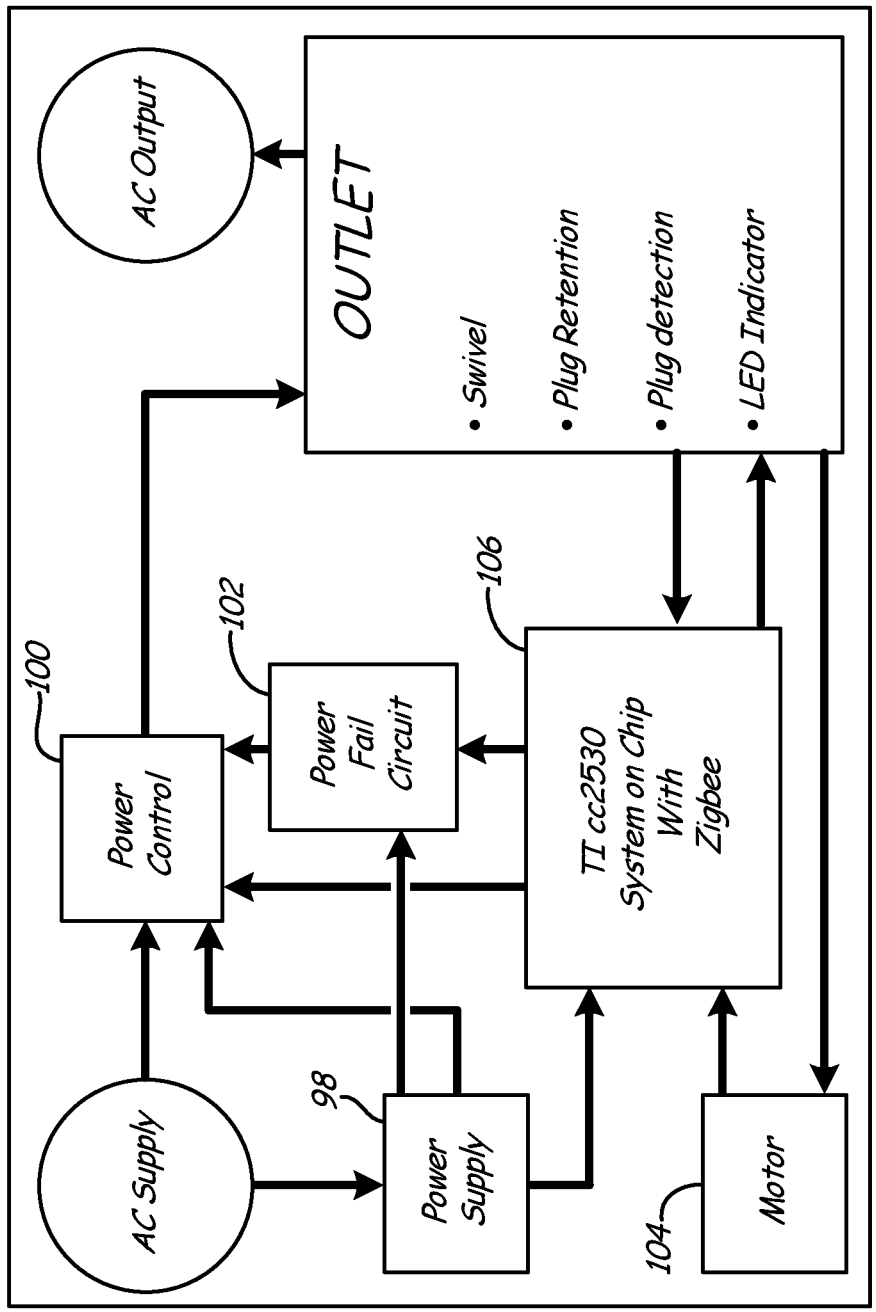
FIG. 23 is a block diagram of several components of one embodiment of the outlet in accordance with the present invention.

FIG. 23 is a block diagram depicting embodiments of several electronic components of one embodiment of the smart outlet 4. FIG. 23 shows a power supply 98, a power control circuit 100, a power fail circuit 102, a power monitoring circuit 104, and a networking chip 106.

Internal Power Supply 98

Figure 24A:
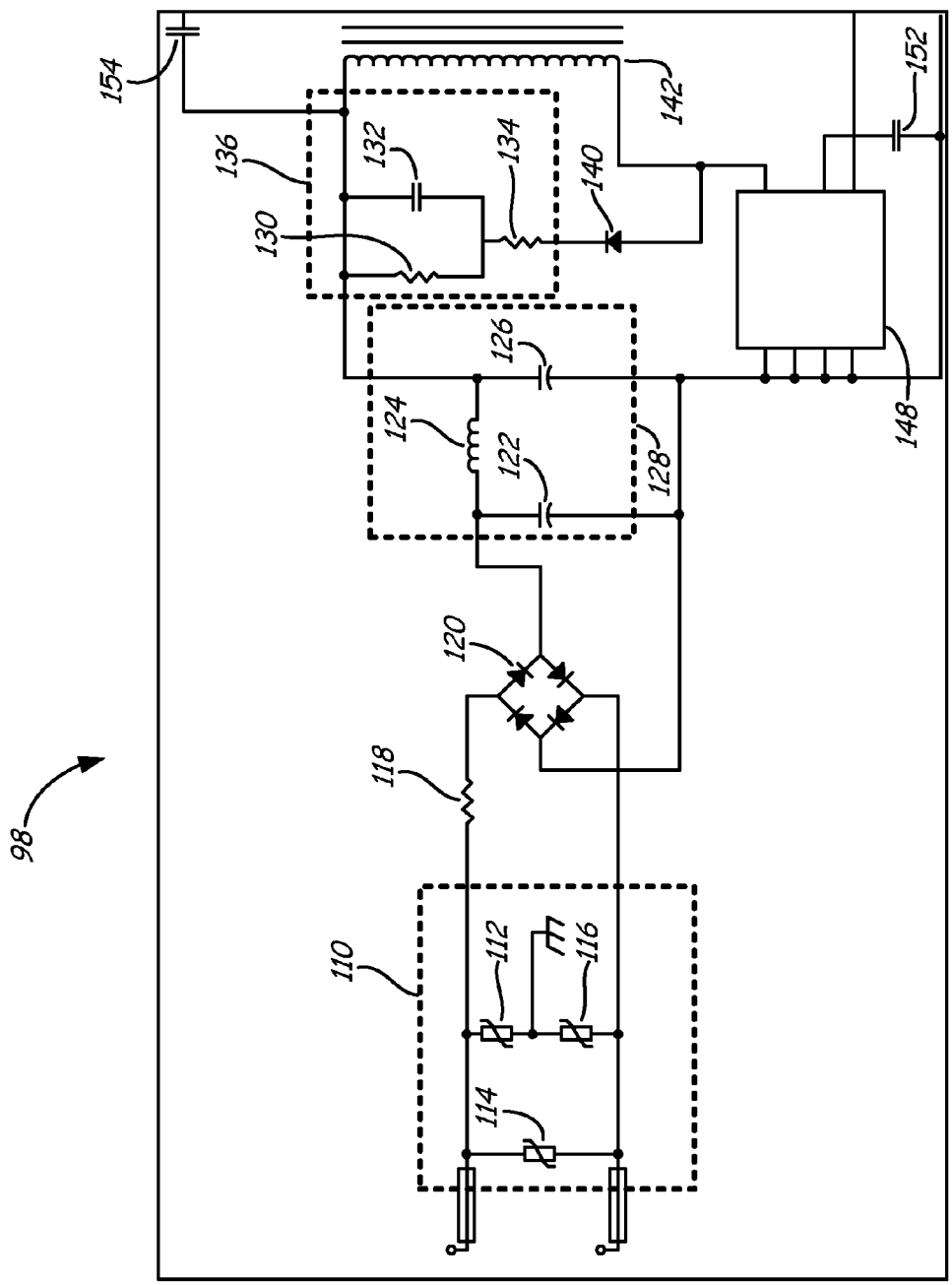
FIGS. 24A-B and 25 show circuit diagrams for an internal power supply for the outlet of FIG. 23 in accordance with the present invention.
Figure 24B:
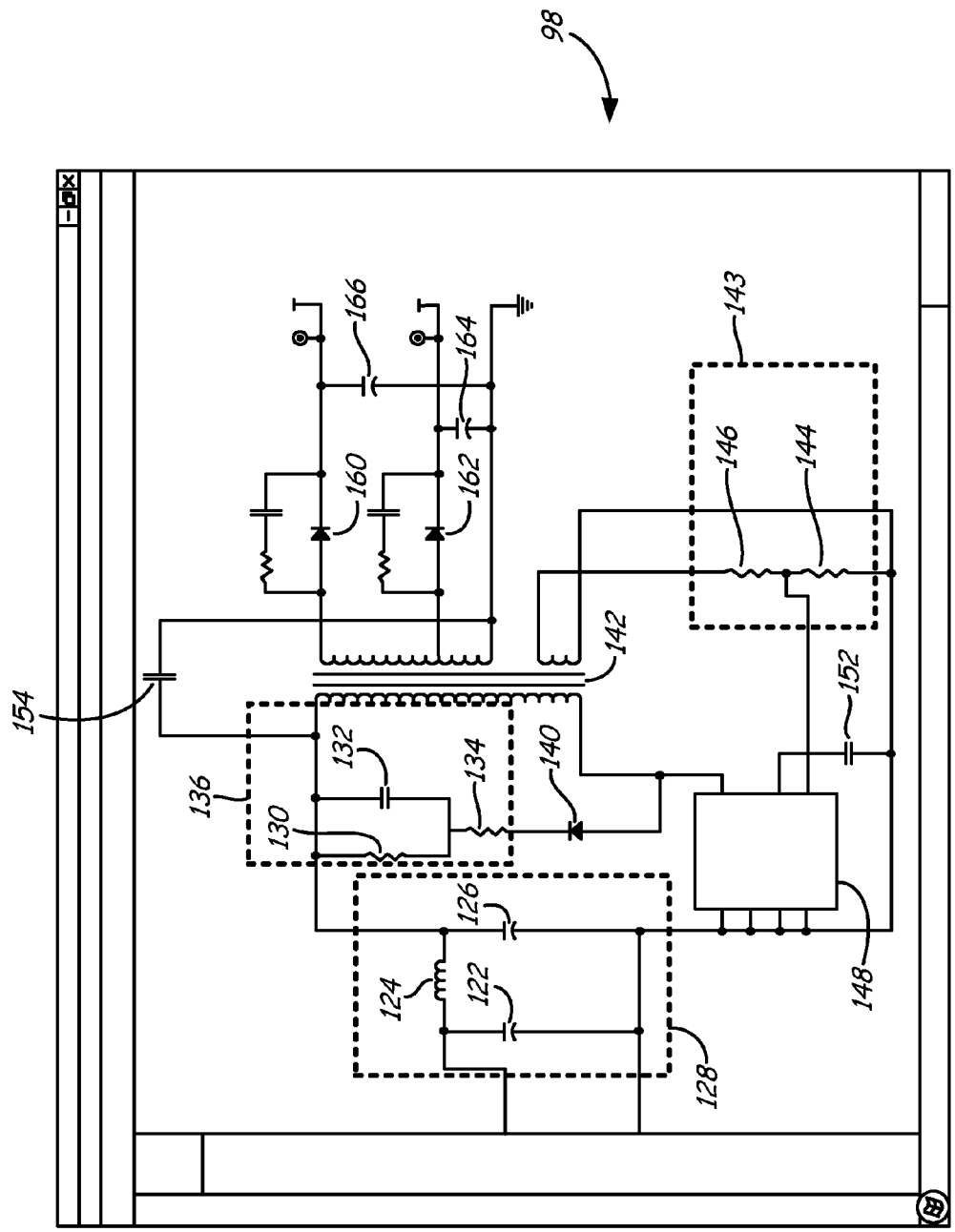
Figure 25:
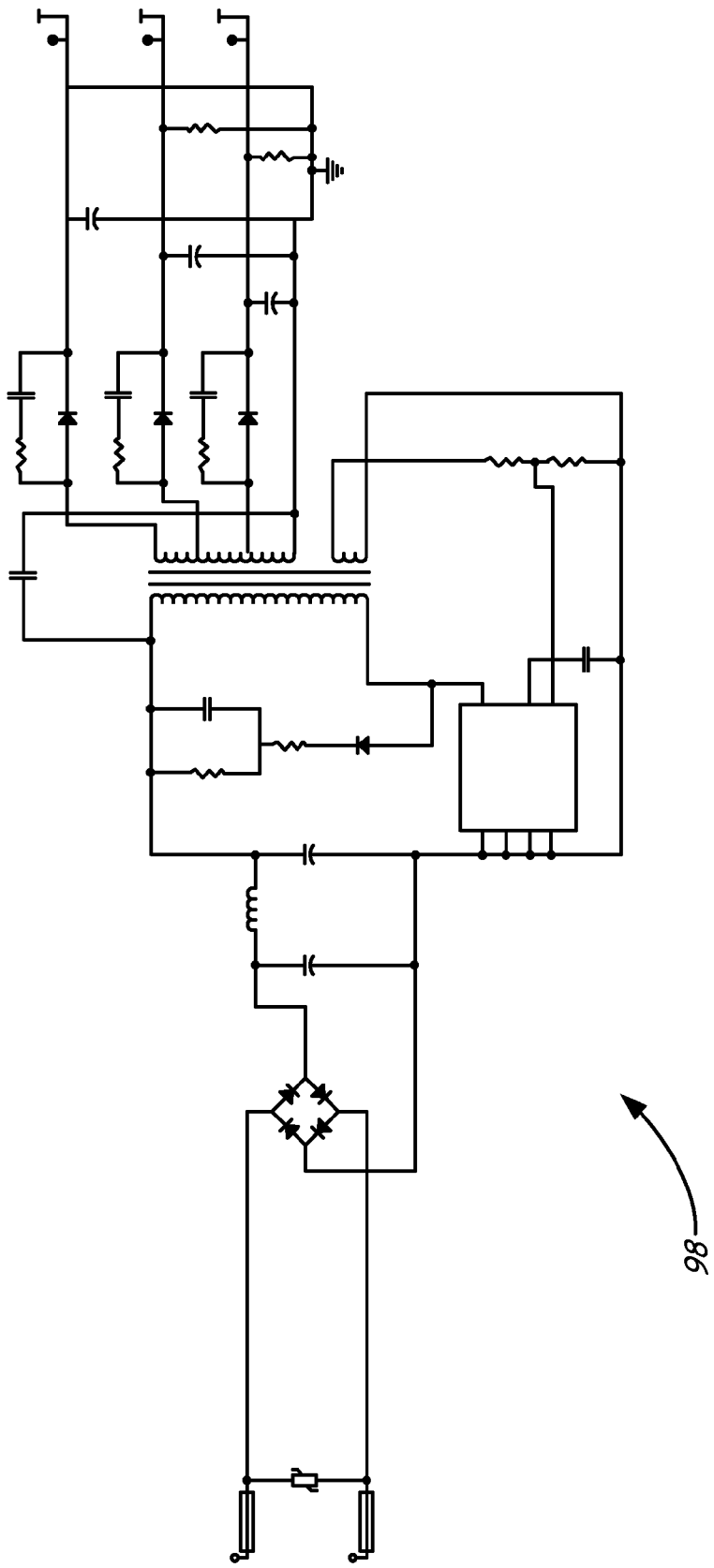
Figure 26:
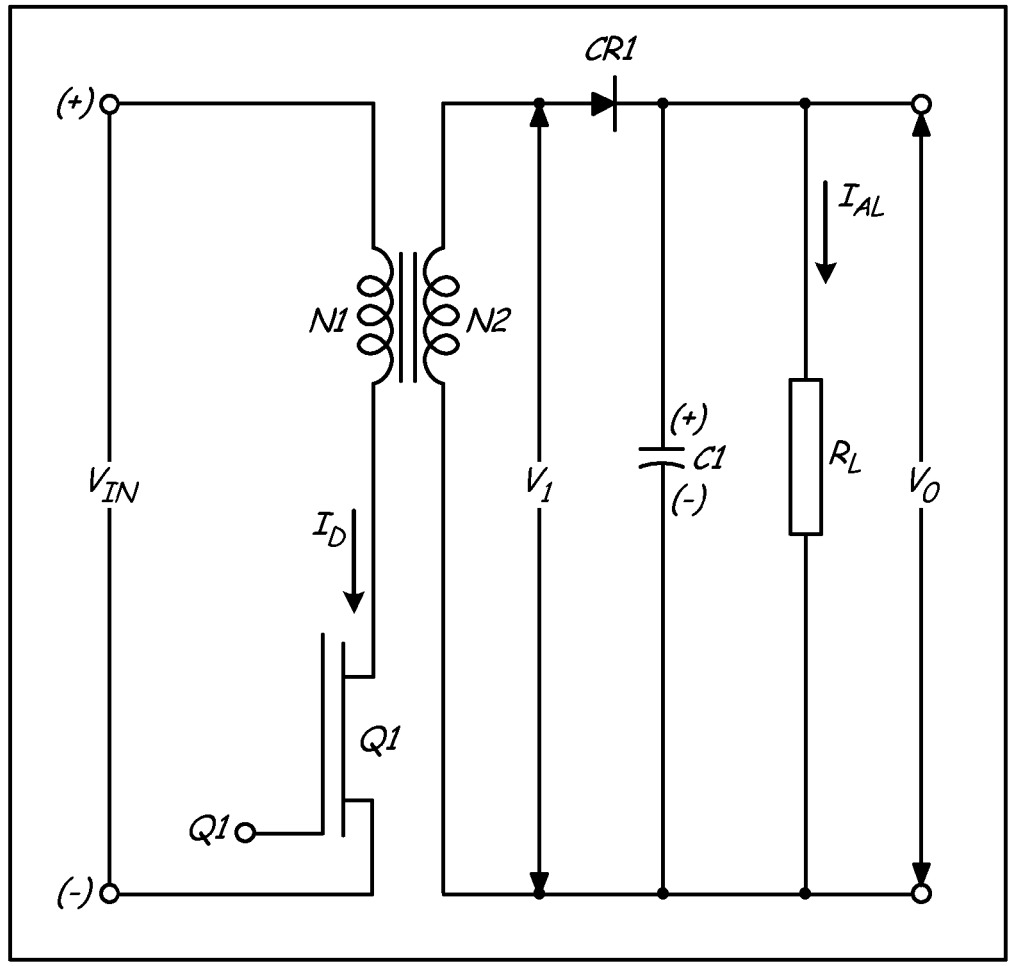
FIG. 26 shows a power supply flyback topology used in the circuit diagram of FIG. 24 in accordance with the present invention.

FIGS. 24A-B and 25 depict embodiments of circuit diagrams for an internal power supply 98 for the smart outlet 4. The portion of the circuit shown in FIG. 24 uses a flyback topology as shown by the diagram in FIG. 26. In certain implementations, the no-load power draw for this circuit was below 100 milliwatts.

Referring to FIG. 24A, metal oxide varistors 110 including individual varistors 112, 114, and 116 may be configured to shunt current out of the circuit, for example, in the case of a surge or over-voltage event. The varistors 110 may be selected based on the board layout to maximize their energy absorption at the needed voltage. A fusible flame-proof resistor 118 may be used to limit the current drawn by the supply in the event of a fault. The fusible flame-proof resistor 118 may operate similarly to a fuse at high enough current, which may protect against fires as the fusible flame-proof resistor 118 fuses. The fusible flame-proof resistor 118 may be provided as a safety precaution when the switcher does not include over-current protection.

In FIG. 24A, the bridge rectifier 120 may convert the AC voltage to an entirely positive voltage in preparation for a conversion to high voltage DC. The capacitor 122, inductor 124 and capacitor 126 may operate to form a filter 128, which converts the rectified AC signal to a high voltage DC signal with little ripple. The filter 128 may reduce or eliminate the 120 Hz ripple going into the transformer.

The resistor 130, capacitor 132, and resistor 134 may form a voltage clamp 136, which may clamp the voltage at 390V. The diode 140 may form a path for the current to travel through when the high voltage MOSFET in the switcher is off.

Transformer 142 may be configured as a custom transformer (e.g., manufactured by Minntronix). Transformer 142 may include windings that may be constructed to output the correct voltages based on the frequency of the switching. Transformer 142 may include a bias winding whose output voltage is divided down by a voltage divider 143 formed from resistors 144 and 146, which is then inputted to the feedback on the switcher 148. The voltage divider 143, as well as the bias winding voltage, creates the set point for the control logic inside the switcher. Capacitor 152 is used to select a lower switching frequency, since this is such a low-power design.

The capacitor 154 may be a Y-class capacitor and may be configured to shunt any high frequency conducted emissions away from the line and neutral connection. The capacitor 154 is configured to meet FCC standards, other European EMI standards or both.

Referring to FIG. 24B, diodes 160, 162 may rectify the voltage output and control the output current direction. The diodes 160, 162 may be selected with current ratings of at least three times the maximum output current on each line. The components above the diodes 160, 162 may provide snubbers, which may attenuate ringing on the outputs caused by leakage inductance of the windings of the transformer 142.

Capacitors, 164, 166 may be configured as output capacitors, which may smooth out any ripple on the output before the load is encountered.

Overall, the power supply may output 3.15V at 100 mA and 12V at 40 mA and has an input range of 85-265 VAC and 50/60 Hz.

FIG. 25 illustrates a circuit diagram of a power supply 98 that may be used in connection with the smart outlet 4 and may include some components similar to those described in connection with FIGS. 24A-B.

Power Control Circuit 100

Figure 27:
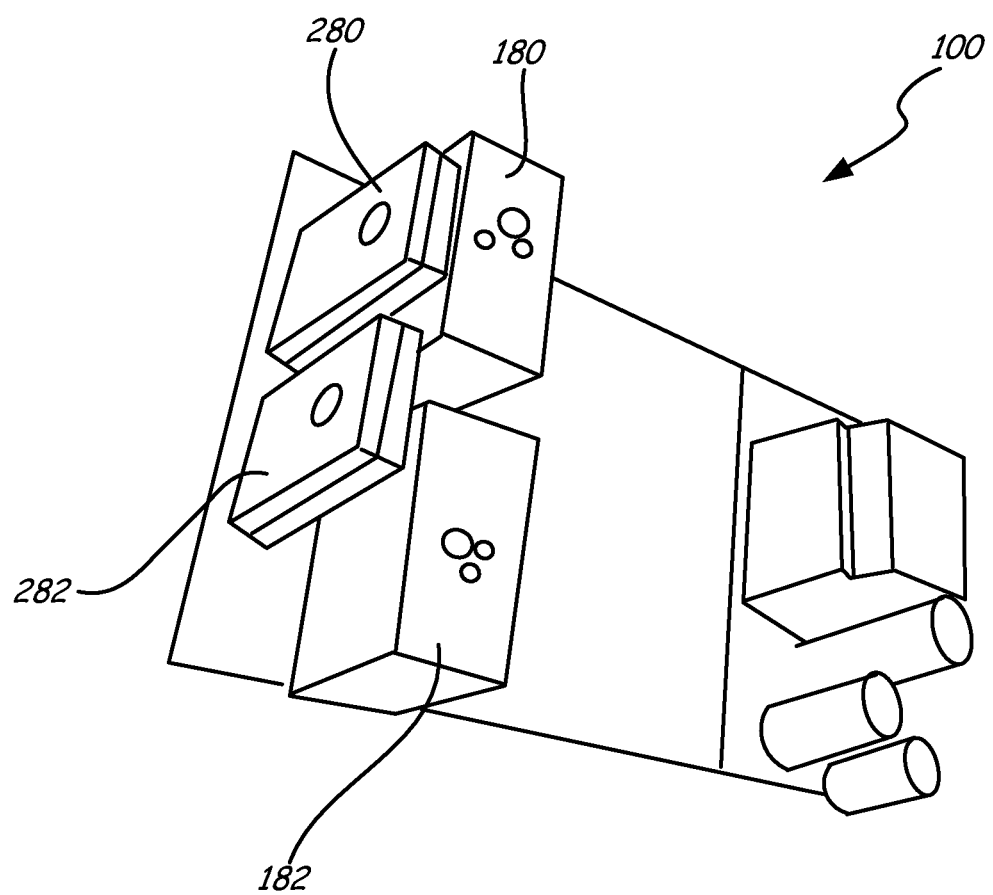
FIG. 27 shows an image of a power control circuit that may be used in connection with the outlet in accordance with the present invention.

The power control circuit 100 shown in the block diagram of FIG. 23 and in the image of FIG. 27 may safely and effectively turn on and off the AC power supply to each individual outlet of the smart outlet 4. The physical disconnect of the AC supply may be implemented with two bi-stable power relays 180, 182 as shown in FIG. 27 (e.g., manufactured by Tyco Electronics—RT314F12). The relays 180, 182 of the power control circuit 100 may operate in a temperature range from −40° to 80° C. Insulation between the open contacts may have an initial dielectric strength of 1000 Vrms and between the contacts and the two coils the dielectric strength may be 5000 Vrms. Each bistable power relay 180 and 182 may be 29 mm long, 12.7 mm wide and 15.7 mm high. The small size of the relays 180, 182 may provide enough room on the printed circuit board to mount two relays to control each outlet individually on the receptacle. The contacts in the relay may be rated to withstand a continuous supply of 250 VAC and 20 A, which is a 5000 W continuous load at the maximum operating temperature of 85° C. and the maximum switching voltage of the contacts is rated at a maximum of 400 VAC. The contact rating of the relay may make the suitable for installation on 15 A or 20 A branch circuits with 120 V or 240 V supplies.

Figure 28:
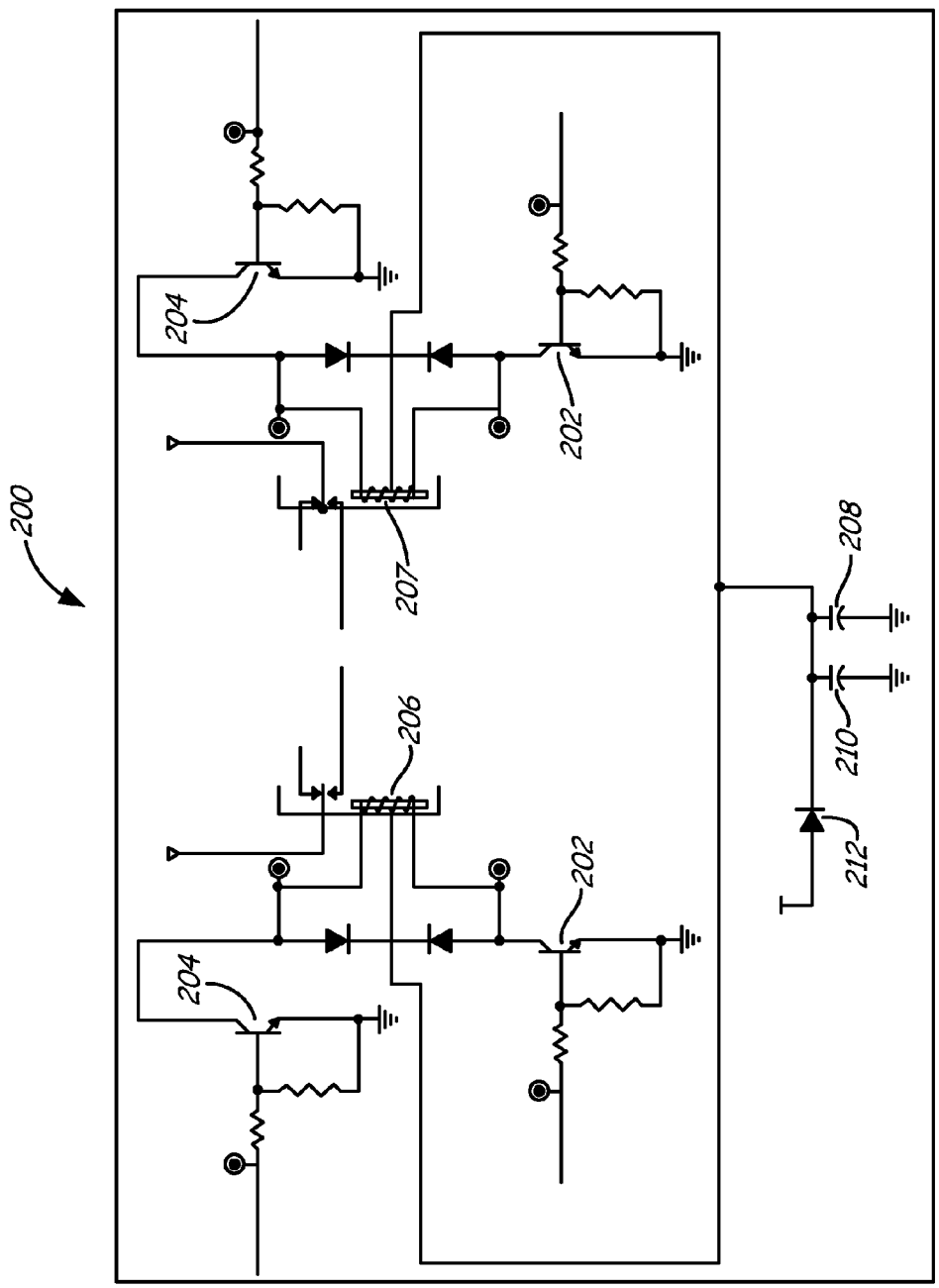
FIG. 28 is a relay circuit diagram provided in connection with the power control circuit of the outlet in accordance with the present invention.

The relays 180, 182 may include contacts configured as single pole double throw with latching capability, which may enable the relay contacts to be normally opened or normally closed. This latching capability may minimize the power consumption by the relays 180, 182 and reduces the amount of heat dissipated in the power control circuit. The mechanical endurance of relays may be 5 million operations, which may allow them to operate at least 100 times every day for an estimated 100 years. The bistable power relays 180, 182 may each include two coils, one coil that opens the contacts (e.g., the "set" coil) and another coil that closes the contacts (e.g., the "reset" coil). For the set coil to operate, it may be supplied 8.4-12 VDC, and for the reset coil to operate, it may be supplied 6.6-12 VDC. Both of the coils may be configured with a minimum energizing durations of 30 milliseconds and a maximum energizing duration of 1 minute. The coils may consume 600 mW of power only for the time duration they are energized, which allows for the total standby power consumption of the power control circuit to be virtually zero. The relay circuit diagram 200 of FIG. 28 may include two general purpose transistors 202, 204 (e.g., MMBT2222A-7), which may be used to switch the "set" and "reset" coils 206, 207 on and off.

Two capacitors 208, 210 may be connected in parallel with the 12 V DC to supply instantaneous 6.6-12 VDC to achieve the minimum duration time required to properly energize the coils. A diode 212 with the capacitors 208, 210 placed in parallel prevent the capacitors from discharging while the coils are not energized. Since voltage is leading current in the coils, a diode is placed across the "set" and "reset" coils 206, 207 to prevent the current from increasing due to reverse electromotive force (back emf), after the coils are energized. The microcontroller 106 (e.g., TI cc2530) will only send out a signal to turn on the general purpose transistor when the pushbuttons on either top or bottom outlet have been pressed in or out. A switch/case function is implemented in the firmware to distinguish from a high or low signal and whether the signal came from the top or bottom outlet. Once the a specific case is selected, the microcontroller will send out a 3 VDC signal to switch on the transistor which closes the power control circuit 100 and energizes the set or reset coil 206, 207.

Other modifications to the power control circuit 100 may be contemplated according to certain implementations, which may be used in combination with or as an alternative to the power control circuit 100 components described above. For example, the relays may be decreased in size to help shrink the overall product so it will fit efficiently in a standard single gang box. The bistable power relays may be configured with a solid state relay, e.g., a solid state relay configured to handle a continuous supply of 250 VAC and 20 A on its contacts, which may reduce the power consumption and heat dissipation while the relay is operating. This may increase the phantom power draw of the device, however.

Power Fail Circuit 102

A smart outlet 4 in accordance with the present invention may include a power fail circuit 102, which may serve as a failsafe in the event of a catastrophic system failure, such as a microcontroller failure, a power supply failure, or another type of failure that results in an non-operational outlet. The power fail circuit 102 may be configured to activate the outlets into the 'ON' state when a system failure occurs.

The power fail circuit 102 may be configured to use inverters to drive transistors to drive the relay circuit on the power supply failsafe circuit 102, and a monostable multivibrator (one-shot) to drive transistors, which drive the relay circuit. The circuits are shown in FIGS. 29 and 30.

Figure 29:
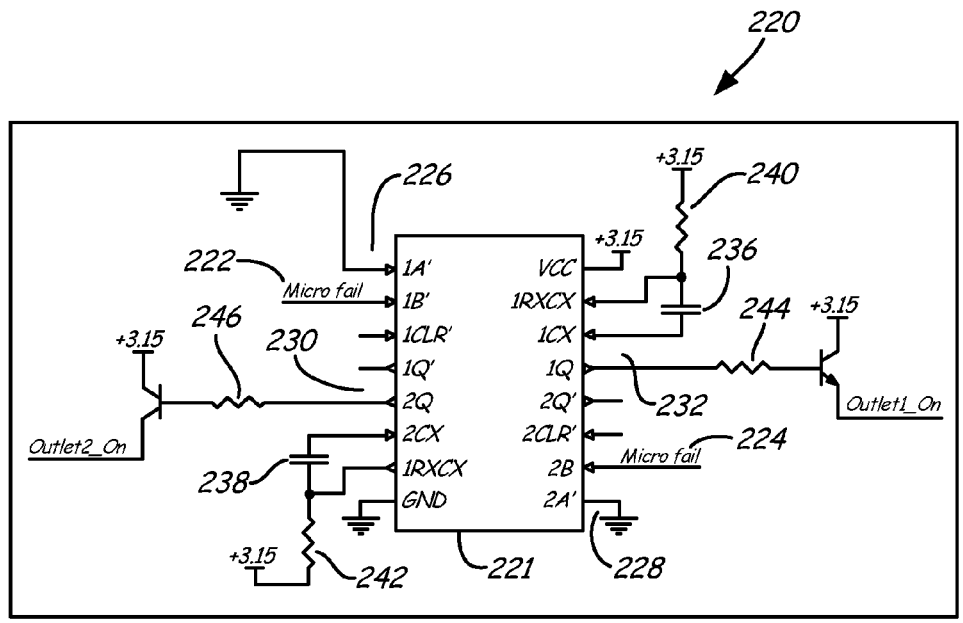
FIG. 29 shows a microcontroller failure circuit of the outlet in accordance with the present invention.

FIG. 29 illustrates a microcontroller failure circuit 220 that may be configured with one-shot circuitry 221, which turns the outlet on when the microcontroller 106 fails. The "microfail" signal may be fed into pins 222 and 224 of the one-shot, while pins 226 and 228 are grounded. This configuration may cause a pulse to occur on pins 230 and 232, the outputs, when a falling edge is seen on the micro-fail signal line. This pulse may trigger the relay circuitry long enough for the relays to switch the outlet on. The length of the pulse may be determined by capacitors 236, and 238; as well as by resistors 240 and 242. Resistors 244, 246 may be configured with the proper resistor values to turn the transistors completely on when 3.3V is the input to the base. One-shot circuitry 221 may be used instead of more inverters, for example, because in the event that the microcontroller fails and the power supply does not, the inverter will continually drive the relay circuit and break the relay coils as well as waste power.

Figure 30:
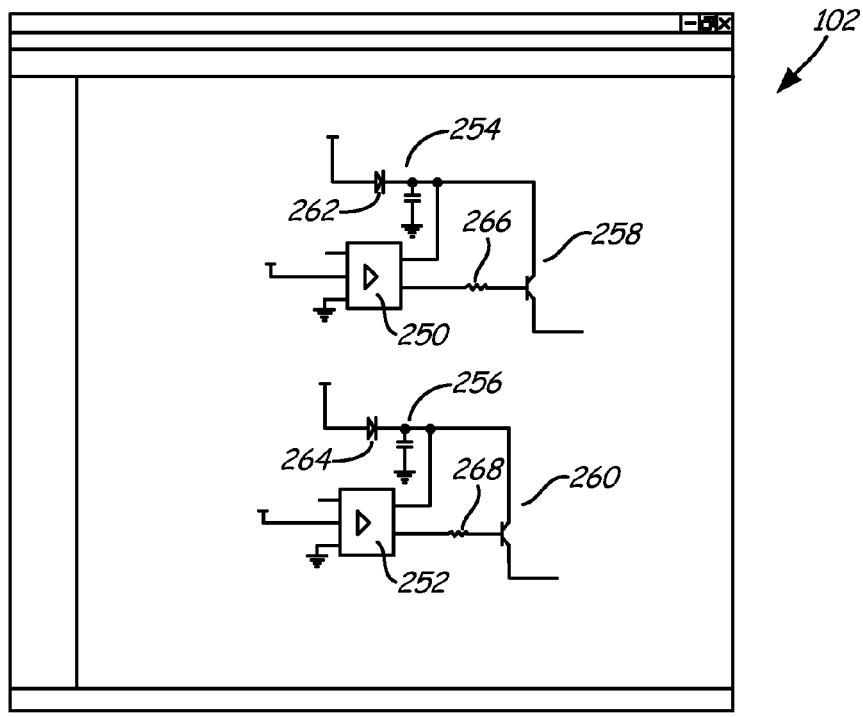
FIG. 30 shows a power supply failure circuit of the outlet in accordance with the present invention.

FIG. 30 depicts the power supply failure circuit 102. The power supply failure circuit 102 may be configured with inverters 250, 252 which output 3.3V when the input is 0V. The input may be connected to the power supply 3.15V output. This means that if the power supply is lost, the inverters 250, 252 will trigger the relay circuit for both outlets 'ON'. The capacitors 254, 256 may supply the inverters 250, 252 and transistors 258, 260 because if the power supply has failed, they must have the capacitors 254, 256 as a backup 'battery' for the 30 ms needed to trigger the relay. The diodes 262, 264 ensure that the capacitors remain charged when the power supply fails. The resistor 266, 268 and transistor 258, 260 setup is the same as in the microcontroller failure circuit 220.

Power Meter 104

Figure 31:
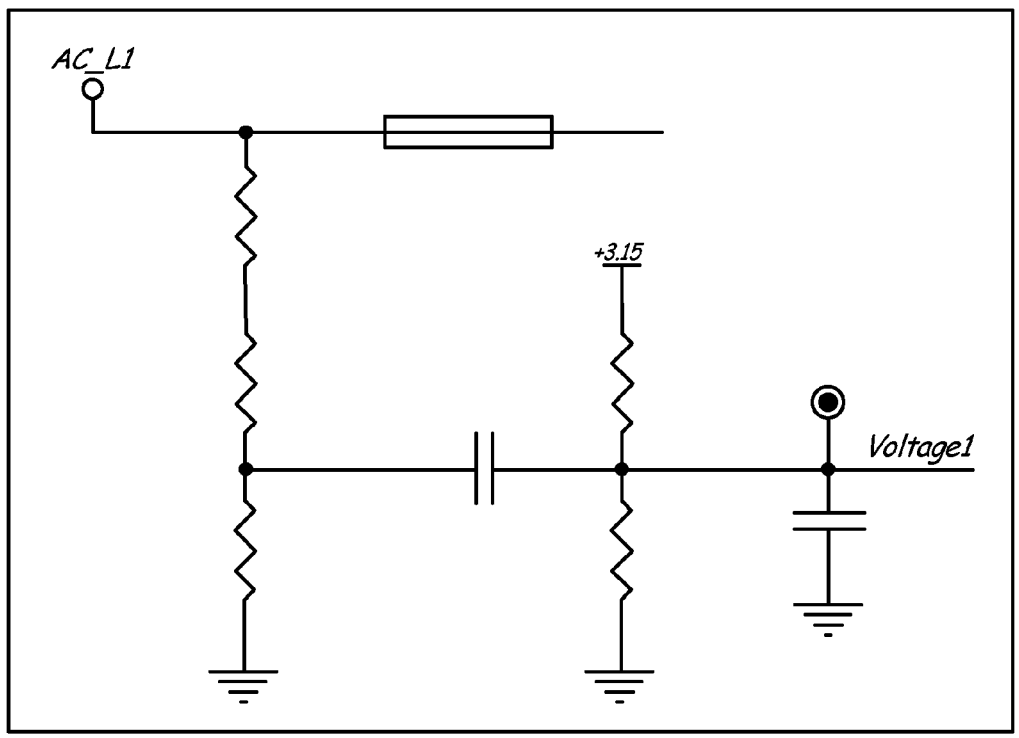
FIG. 31 shows a circuit diagram used in connection with the meter of the outlet in accordance with the present invention.
Figure 33:
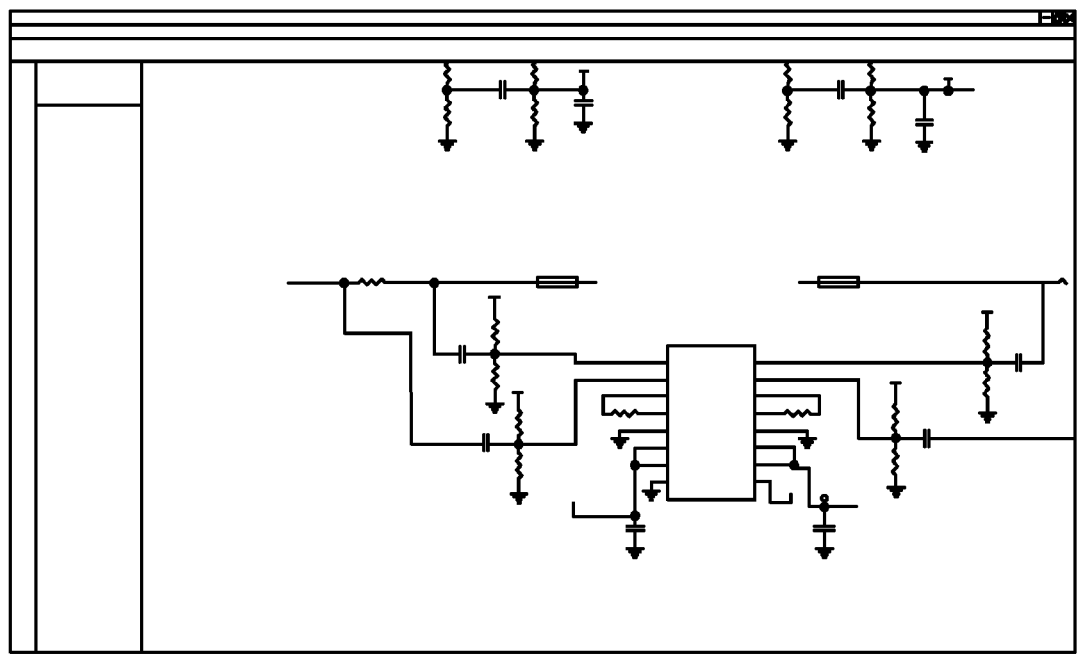
FIG. 33 shows a circuit diagram used in connection with the meter of the outlet in accordance with the present invention.

The power meter 104 of the block diagram of FIG. 23 may be configured to measure the instantaneous voltage and current from the two outlets in the enclosure for power monitoring and standby detection services. Current may be measured from the voltage drop across a very small known resistance. Voltage may be measured across the smaller of two large resistors in parallel. The ratio between the two is set so that the peak voltage typically seen in a cycle may be reduced to a 3V range, this is the main area where a change is needed between 120V and 240V power. FIGS. 31 and 33 show circuit diagrams used in connection with the power meter 104. Two of each circuit are provided, one for the top socket and another for the bottom socket.

Figure 32:
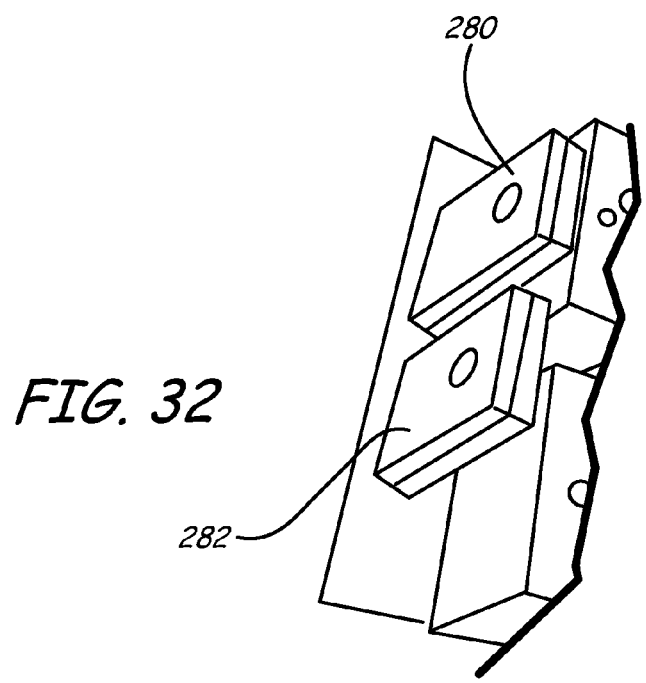
FIG. 32 shows current sense resistors used in connection with the meter of the outlet in accordance with the present invention.

The meter 104 may be configured to translate large voltages and currents into the small range the microcontroller's analog-to-digital converter will accept with minimal parasitic loss. $P_{loss}=V_{mains}2/R_{divider,eq}+I_{drawn}2R_{current,sense}$ per outlet. This parasitic loss may be minimized when the current sensing resistance is very small, under 30 mOhm and the voltage divider equivalent resistance is great, 100 kOhms or higher. Current sense resistors 280, 282 are shown in FIGS. 27 and 32.

Both current and voltage signals may fluctuate above and below digital ground and the voltage from the current sense resistor will be too small to measure. A differential amplifier with VDD/2 as its reference voltage is used to accomplish the goal of shifting the waveforms to be centered around 1.5V and amplifying the current sense voltage to a reasonable range. $Gain_i=2*I_{max,rms}*R_{sense}*3V*0.9/0.707/$The number of voltage and current samples required per second may be relatively large. For example, sampling once per cycle is insufficient because voltage and current of an AC system can vary in phase, frequency may change and non-linear loads may create distorted current waveforms. Both current and voltage may be sampled at 1.8 kHz with the CC2530 ADC. When both outlets are on, and voltage may be measured separately per outlet, this equates to 7,200 A/D conversions per second. This may enable slightly under 130 uS for each conversion.

The analog signals may be converted to 12-bit digital values representing voltage and current, power was computed through hardware multiplication of adjacent voltage and current samples. The sum of this product may be the energy consumption of that particular outlet. Dividing the sum over a period by the number of samples may produce the average power of that interval. To find the average of the voltage or current waveforms a technique called root mean squared is used. In performing an rms calculation each individual sample is multiplied by itself, divided by the number of samples and has the square root taken. RMS voltage and RMS current may be multiplied to find the apparent power. Power factor, a metric of how much of the current used by an appliance is performing useful work, may be calculated by dividing average power by average apparent power from the same interval.

Other modifications to the power meter 104 may be contemplated according to certain implementations. For example, the power meter 104 may use the MSP430FE427A application processor, which may simplify the analog circuitry as it features built in programmable gain amplifiers. The processor may provide six 16-bit ADCs with a 4.096 kHz sampling rate, which may more than double current sampling rate with 16 times the resolution, thus raising current metering resolution from 10 mA to 0.65 mA. The hardware multiplier may be configured to be more powerful and may run independently from rest of the CPU's program even in standby and low power modes so energy is always tracked. Conversion accuracy may be improved to meet stringent 0.1 percent requirements of smart meters. Several types of power metering tamper detection may be provided so the outlet's reading can be trusted by a utility company. The application processor may free up processor time and memory from the cc2530 ZigBee system on a chip, which may then be allocated towards implementing the Smart Energy profile stack and communication.

In some implementations, the MSP430 may not support ZigBee directly so the cc2530 will still be needed as an interpreter. This may add the possibility of power line communication. It uses the same voltage power supply as our current MCU. Lastly it has an integrated 160 segment LCD driver so a rudimentary screen could be placed on a handheld remote. Showing things like outlet selection and real-time power draw, but not fine graphics or multiple colors.

Networking

Figure 34:
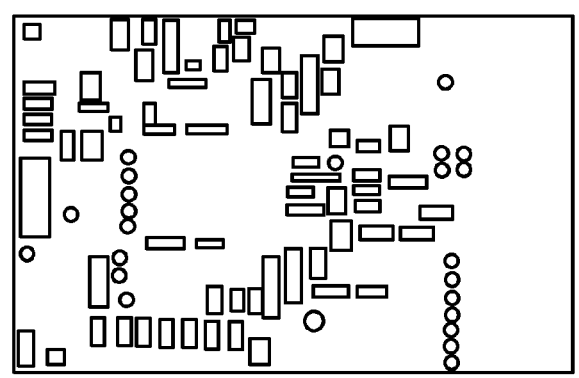
FIG. 34 shows a networking circuit that may be used in connection with the outlet in accordance with the present invention.

Networking may be handled by a CC2530 system on a chip from Texas Instruments. The CC2530 may be a ZigBee enabled device, shown in FIG. 34, allowing the smart outlet 4 to communicate with any other outlet or properly programmed ZigBee enabled device.

Display Controller 6

Figure 35:
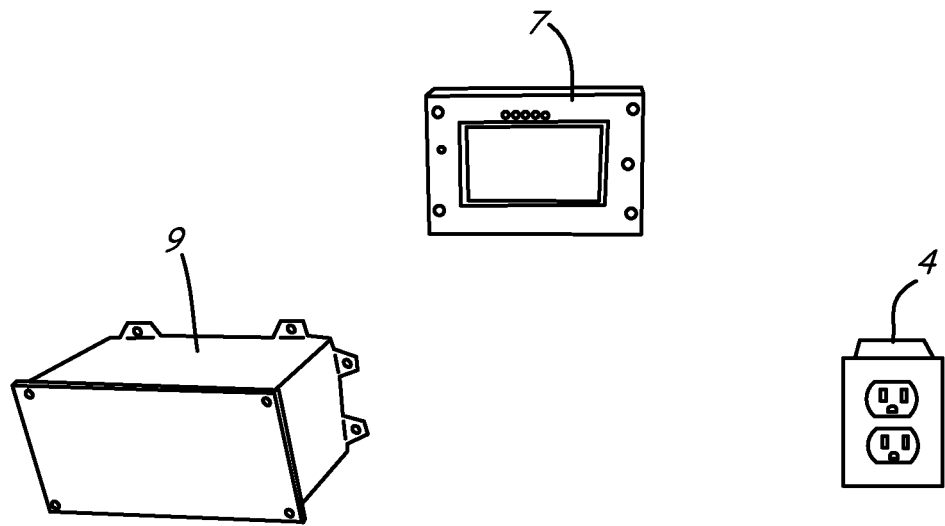
FIG. 35 shows the smart outlet, the display controller and the load controller in accordance with the present invention.

In some implementations, the display controller 7 (e.g., the display board) contains five components: the power supply, the MCU (also "PIC32"), wireless network chip, a ZigBee chip and an LCD touch pad. The power supply provides power to all components on the display controller 7. The MCU controls information flow to and from all components. The wireless chip allows communication to a wireless LAN to access a server. The ZigBee uses RF communication to get information from the outlets. The LCD touch screen allows for a simple and comfortable user interface for an end user. The display controller 7 may be based on a multimedia expansion kit (DS61160A) made by Microchip. FIG. 35 shows the display controller 7, the smart outlet 4 and the load controller 9 (described below) each of which may be communicatively coupled.

Figure 36:
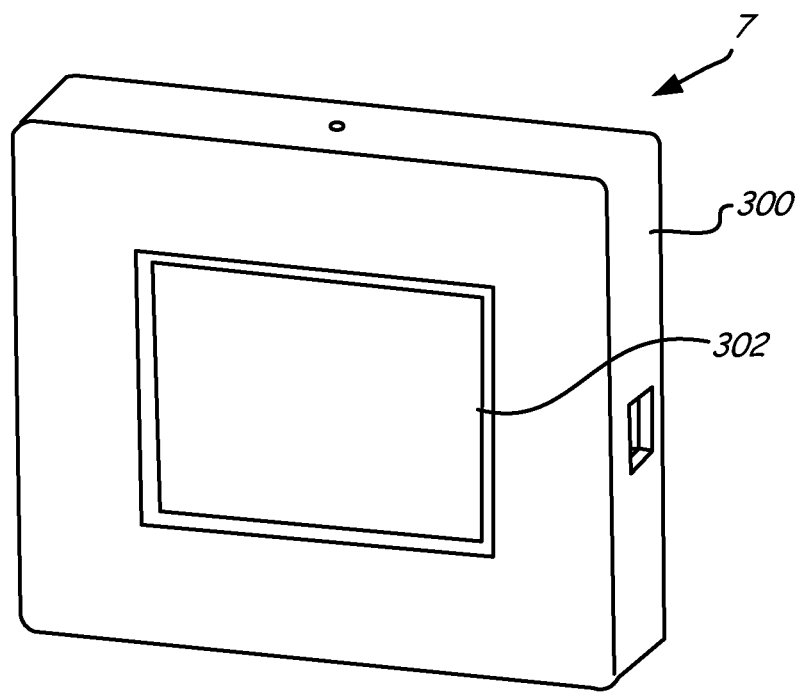
FIG. 36 shows the display controller in accordance with the present invention.
Figure 37A:
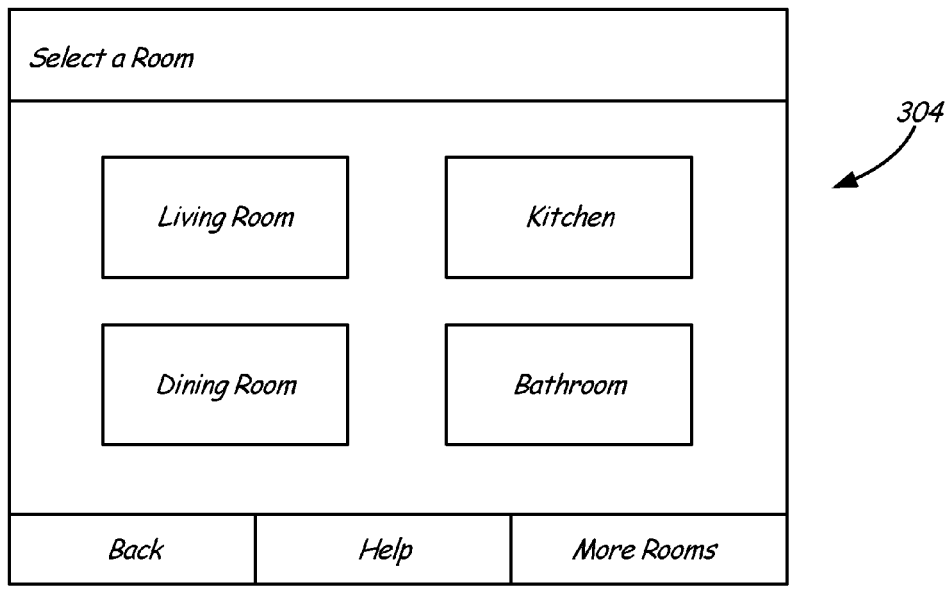
FIGS. 37A-37F show screen shots of the touch screen of the display controller in accordance with the present invention.
Figure 37B:
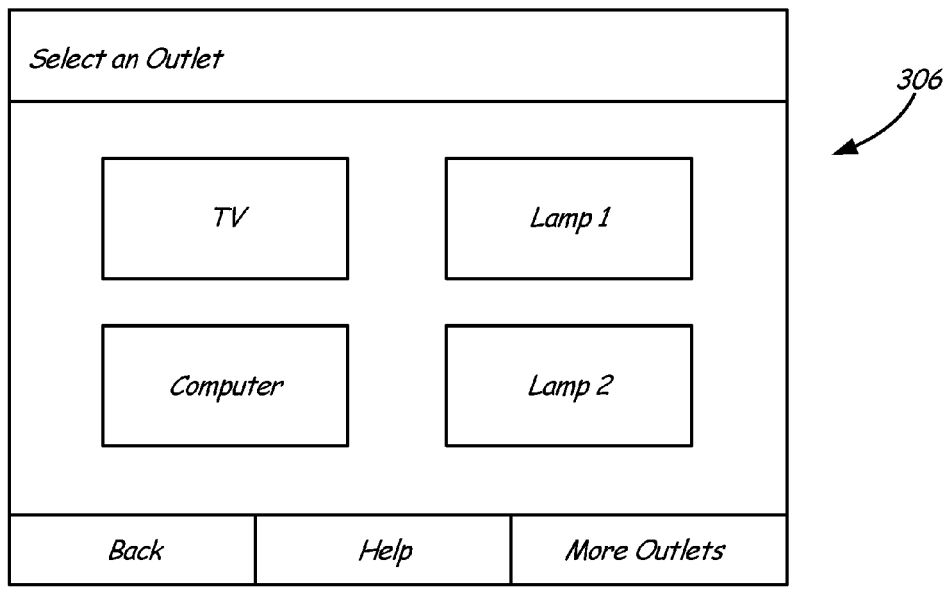
Figure 37C:
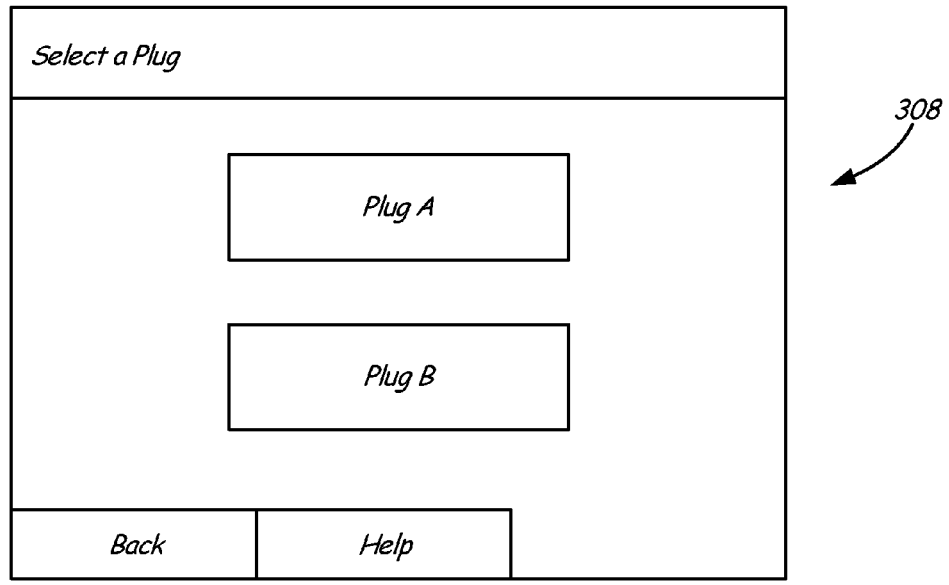
Figure 37D:
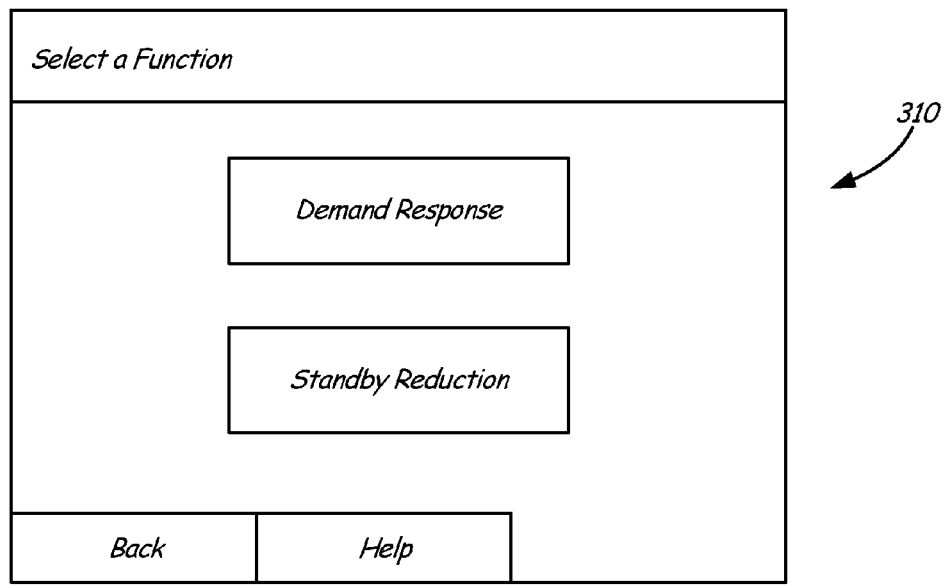
Figure 37E:
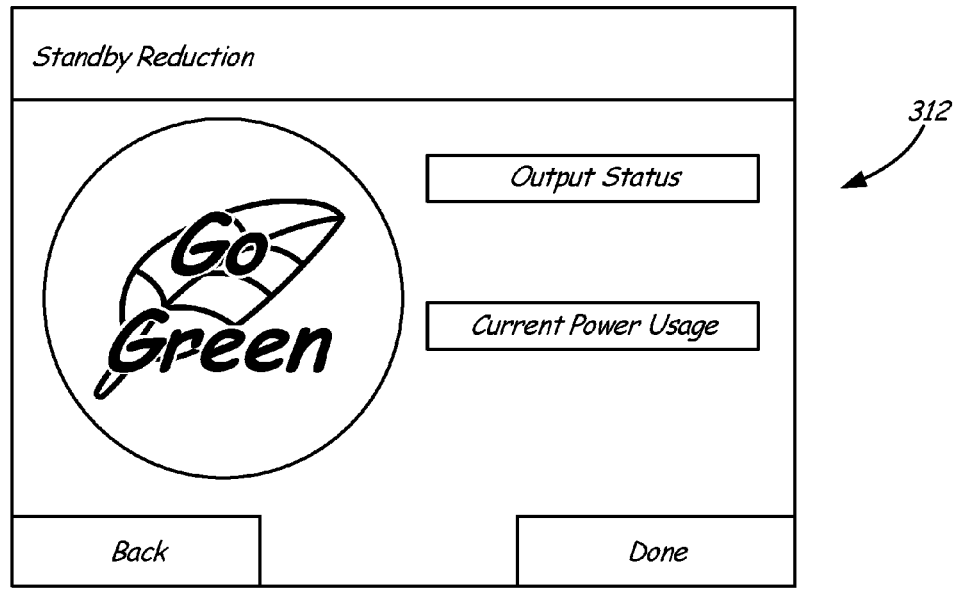
Figure 37F:
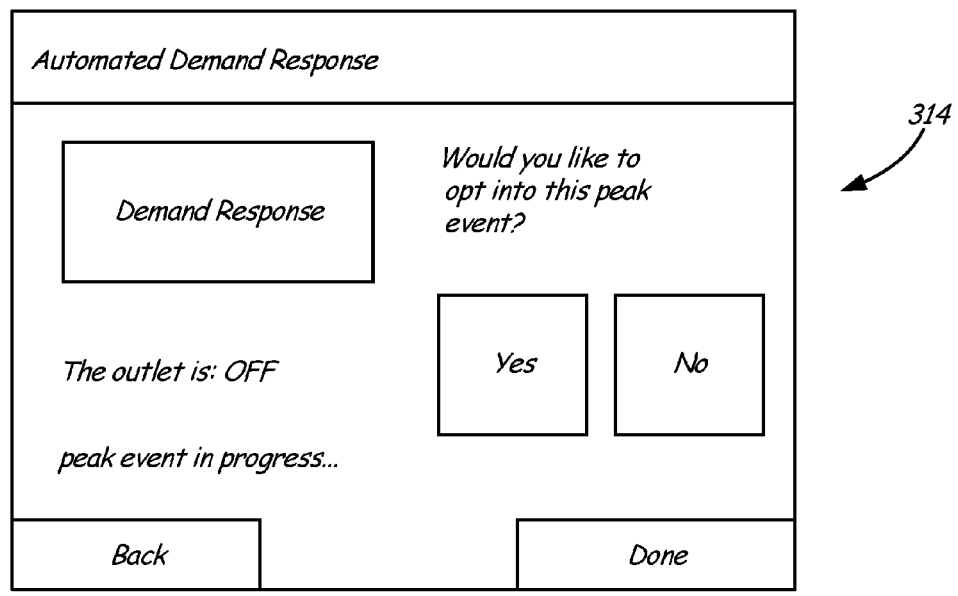
Figure 37G:
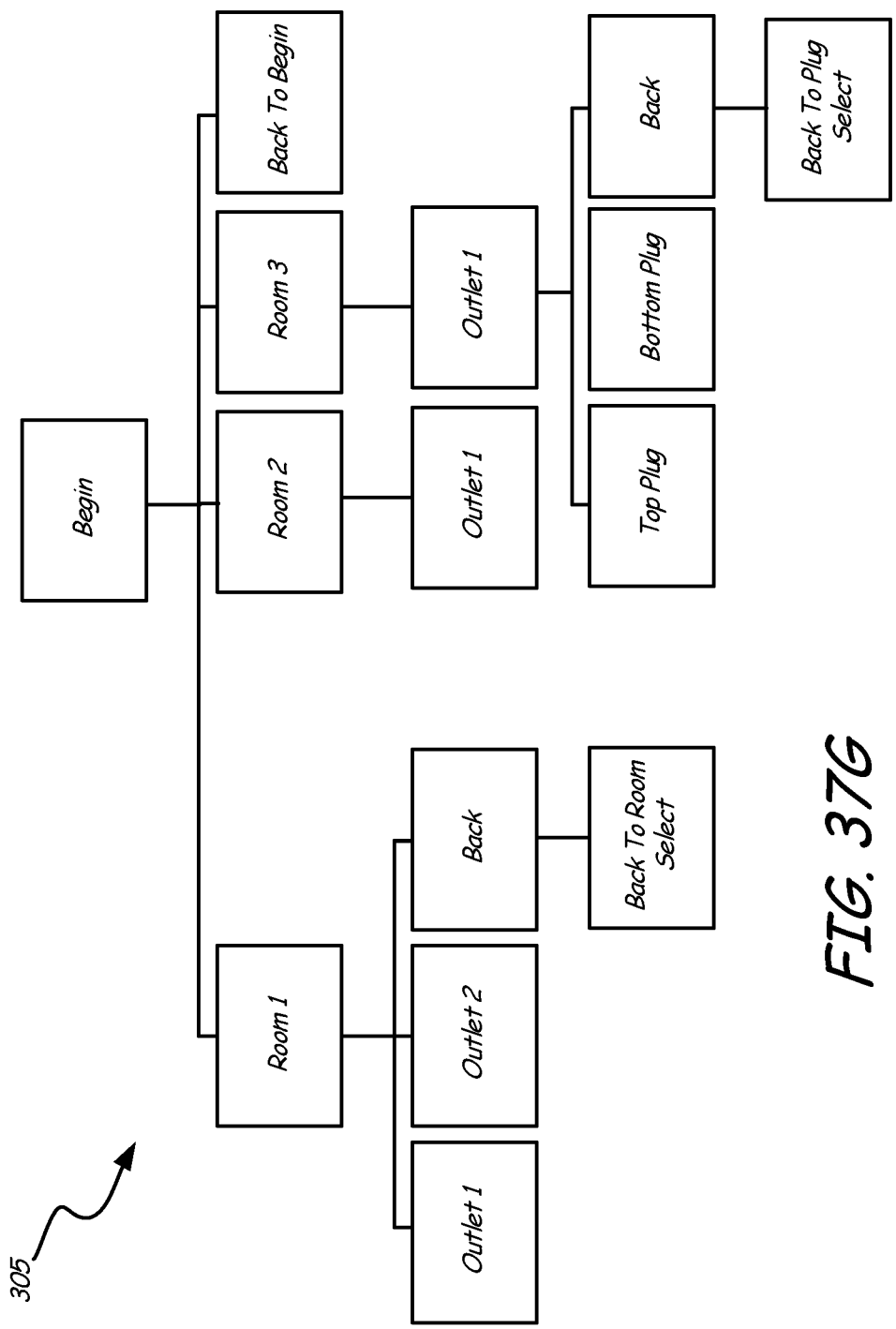
FIGS. 37G-37K are flow diagrams illustrating the programming flow through the display screens of FIGS. 37A-37F.
Figure 37H:
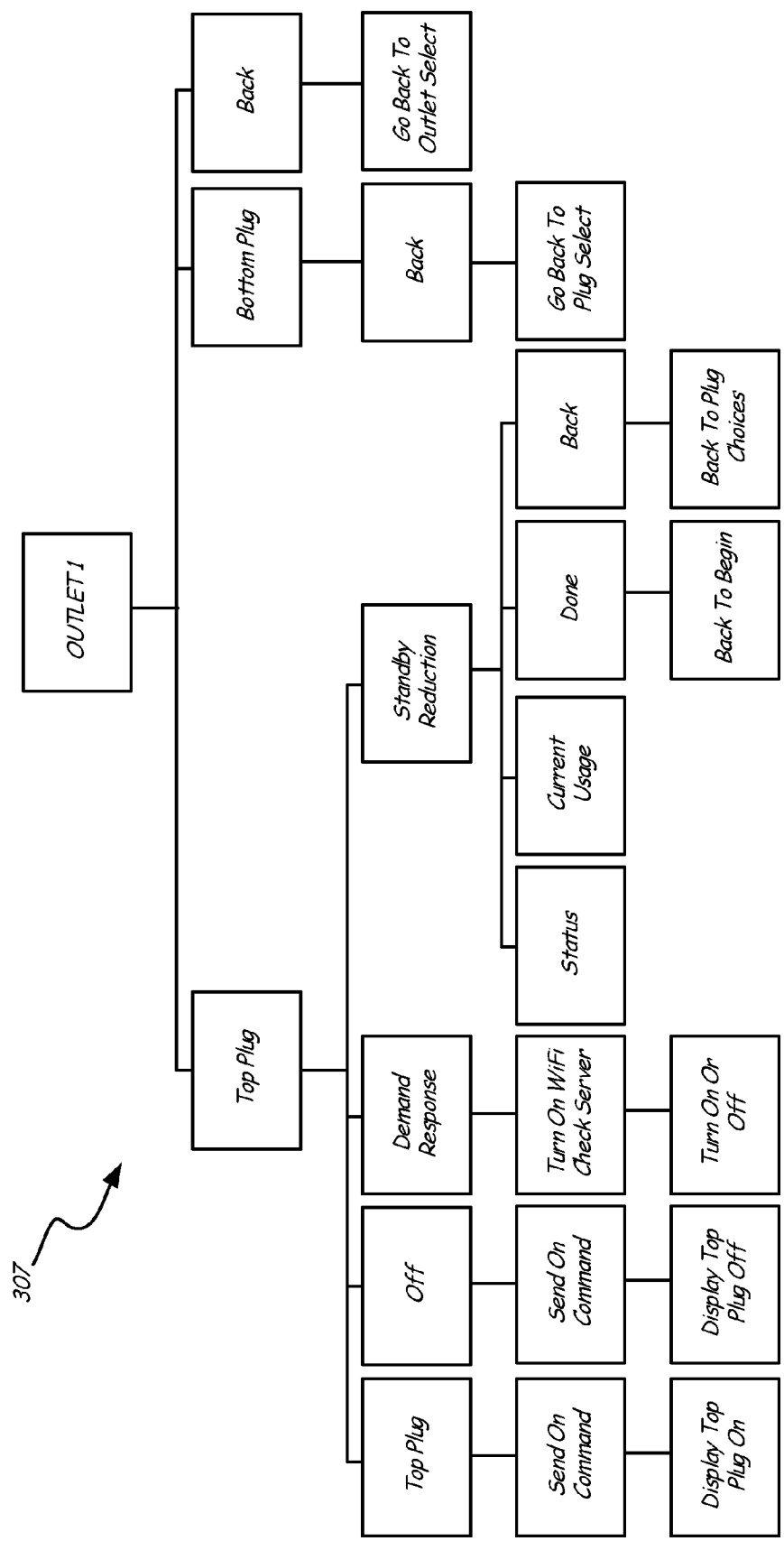
Figure 37I:
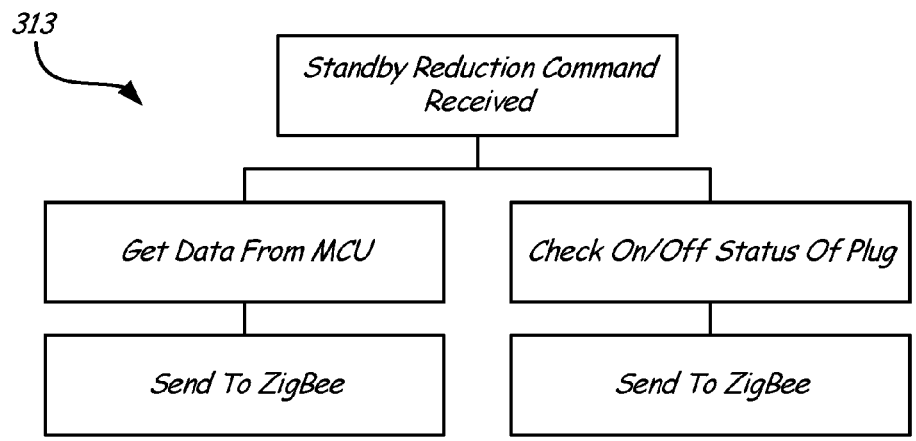
Figure 37J:
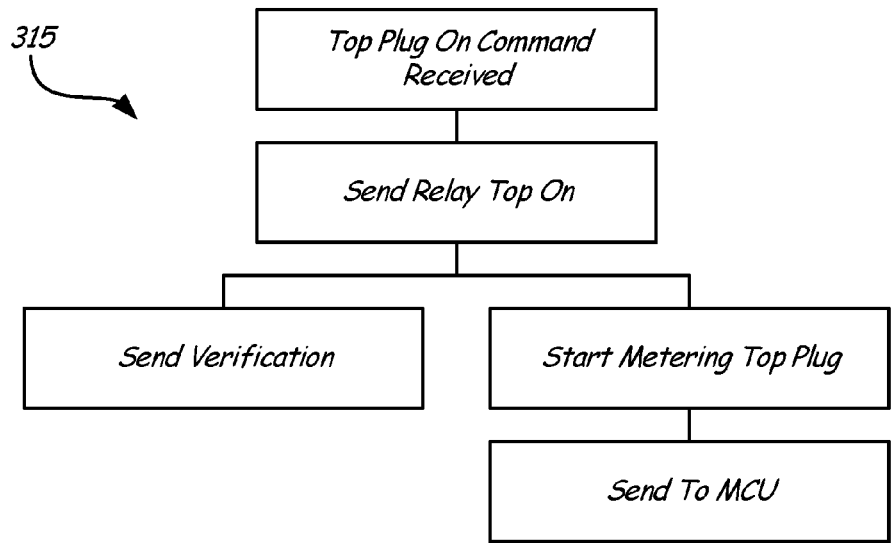
Figure 37K:
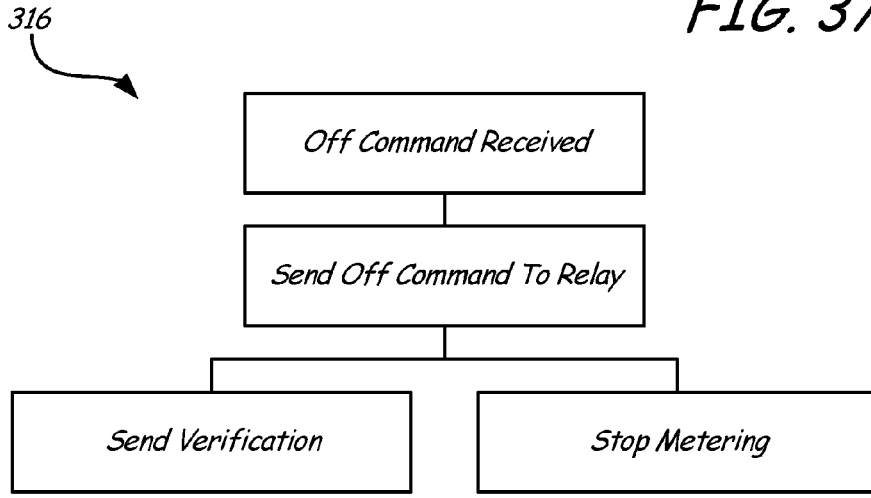

FIG. 36 shows the display controller 7 with an exemplary housing 300 and touch screen 302 that may be used to control smart outlets 4 and the load controller 9, for example, by selecting a series of icons displayed on the touch screen 302. The touch screen 302 may be used by the user to understand where and when power is being used. Users may control when they want to power a certain smart outlet 4 and schedule when to use the outlets daily. For example, the touch screen 302 may display the screen shots depicted in FIGS. 37A-37F, which enables the user to traverse through the display screens 304-314. Flow diagrams showing the programming flow through the display screens 304-314 are shown in the flow charts of FIGS. 37G-37K and are referenced in connection with the touch screen shots of FIGS. 37A-37F discussed below. In one implementation, FIG. 37A shows room display 304 listing a number of rooms (e.g., living room, kitchen, dining room, and bathroom) that enables the user to select a room having a smart outlet 4 to be controlled. The flow diagram 305 of FIG. 37G shows the programming flow as the user selects a room from display 304. Upon room selection, the user may view outlet display 306 of FIG. 37B that enables the user to select a smart outlet 4 (e.g., TV, Computer, Lamp 1, Lamp 2) within the selected room. The flow diagram 307 of FIG. 37H shows the programming flow as the user selects the outlet from display 306. Upon selecting the outlet, the display 308 of FIG. 37C enables the user to select the plug in the smart outlet 104 to be controlled, which enables the programming flow 307 of FIG. 37H to proceed. Once the plug is selected from display 308, the select a function display 310 of FIG. 37D may enable the user to select the type of power control feature (e.g., demand response or standby reduction) to be implemented at the selected plug. When the standby reduction option is selected from display 310, the standby reduction display 312 of FIG. 37E may be presented on the touch screen 302, which enables the user to view the outlet's status and the instantaneous power usage. The flow diagram 313 of FIG. 37I shows the programming flow as the user selects the standby reduction option from the display 310. When the demand response option is selected from display 310, the automated demand response display 314 of FIG. 37F may be presented on the touch screen, which enables the user to confirm to opt into peak events. The flow diagrams 315, 316 of FIGS. 37J and 37K show the programming flows for when the user selects to turn on and off the plugs of the smart outlets 4 and may be implemented in connection with opting into the peak events option shown in FIG. 37F, or in connection with other functions that may be provided by the display controller 6.

Figure 38:
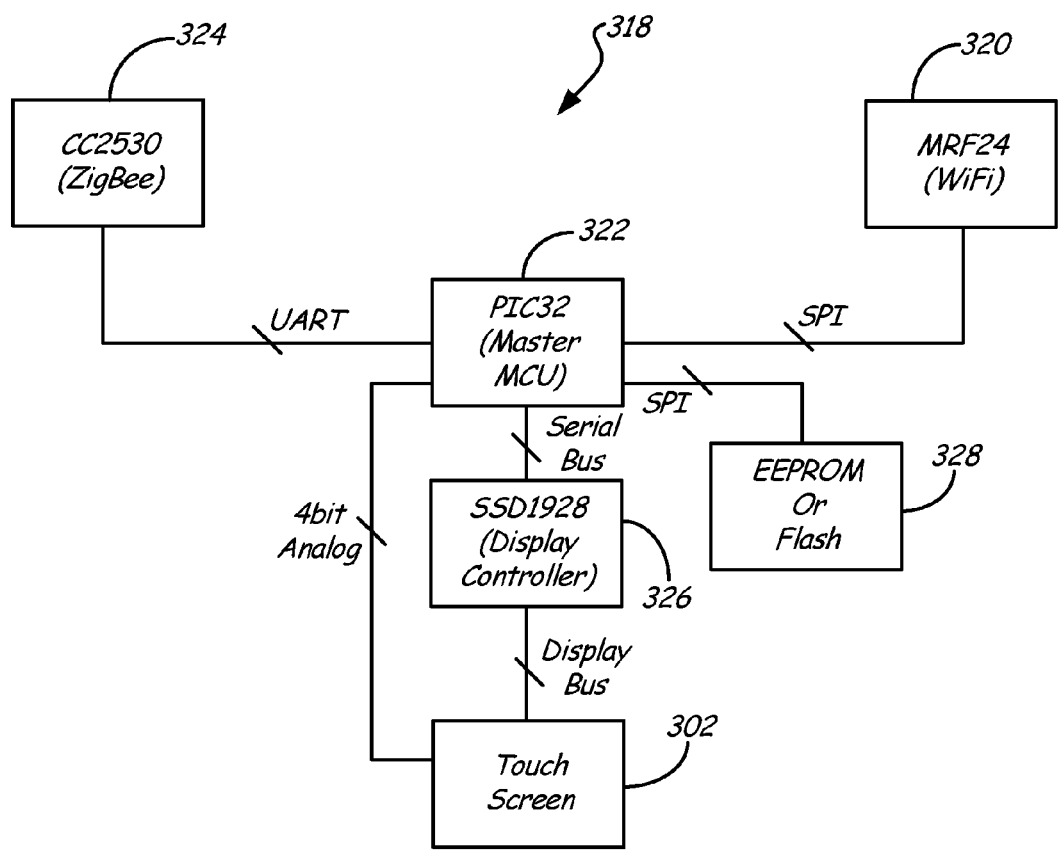
FIG. 38 shows a block diagram of the display controller.

FIG. 38 shows a block diagram 318 of the display controller. The block diagram 318 shows a high level view of how the display controller components are inter-connected. The display controller may be configured to enable control using Wi-Fi 320 (e.g., via a MRF24WB0MA transceiver). This transceiver interfaces the PIC32 controller master MCU 322 with the LAN and a web server where the user can monitor outlet energy usage and current energy pricing. As described above, a user may be able to remotely turn on/off outlets and to decide if they wish to opt in to a peak usage time and save on their energy cost.

Though the user will send the command through Wi-Fi 320 to the master MCU 322, a ZigBee chip 324 (CC2530) network interfaces the outlet board with the master MCU 322 and propagates the command from the user, e.g. to turn on or off an outlet. This will also send energy usage information from the outlet to the master MCU 322, and through the master MCU 322, to the touch screen 302 (e.g., LCD display) or a consumer wireless device.

As shown in FIG. 38, the master MCU 322 communicates with all ICs. The Wi-Fi uses a serial peripheral interface to communicate with the master MCU 322. The ZigBee chip 324 communicates via universal asynchronous receiver transmitter with the master MCU 322. The touch screen 302 is used by an end user and is controlled by the display controller 326 (SSD1926) which communicates with the master MCU 322 via serial bus. The EEPROM or flash 328 uses a serial peripheral interface to communicate with the master MCU 322.

The display controller 7 may be considered the brains of the SGEMS. The display controller 7 may include the master MCU 322 which interfaces with the LCD touch screen controller 326 and other display elements, the wireless controller 320, and the ZigBee controller 324. All of these components are placed on this LCD display board and become a central hub for the device.

Firmware Programming of the Display Controller 7

With a number of ICs on the boards, programming takes into account each one individually. Several sub-routines control the GUI, the wireless controller, and the ZigBee network, menus may be navigated and commands issued, an interface for connecting to the wireless network provided, and functionality of commands received from the touch screen or wireless device may be considered. FIG. 38 shows an embodiment of how communication may flow on the display controller 7.

The ZigBee chip 324 (CC2530) on the display board takes commands through a software UART to communicate with the master MCU 322. All programming may be done in C with many libraries available through the ZigBee website. The outlet ZigBee uses a hardware UART channel to communicate with the MSP430F MCU. Between the ZigBee units, RF communication is implemented.

Wireless communication programming may be comprised of transceiver configurations which will be the drivers for the MRF24WB0MA, protocol configurations for the PIC32 TCP/IP stack, and application configurations for website or mobile device communication/interface.

To address any timing difficulties when calling for data from both the ZigBee 324 and Wi-Fi 320 simultaneously, the two will be alternatively activated as they communicate over the same frequency channel. The code may be tested with the multimedia expansion board where a CPLD had been used to select a device; this CPLD may be included in accordance with the present invention. A SPI bus had been the goal, where the peripheral devices are all controlled by the master MCU 322 (PIC32); the activation of individual devices may be done via software.

Load Controller 9

The load controller 9 shown in FIG. 35 may be configured to manage the power delivered to large appliances such as water heaters, pool pumps, or other 30 amp motors. The load controller 9 may receive signals from the PID using ZigBee RF and may be provided within a wall-mounted housing having a sealed cover to ensure the safety of the load controller 9 circuit board. In some implementations, the load controller 9 may include a configuration that is similar to its low-power counterpart with the exception that the load controller is configured with relays that can handle larger current flows.

Outlet Board

Figure 39:
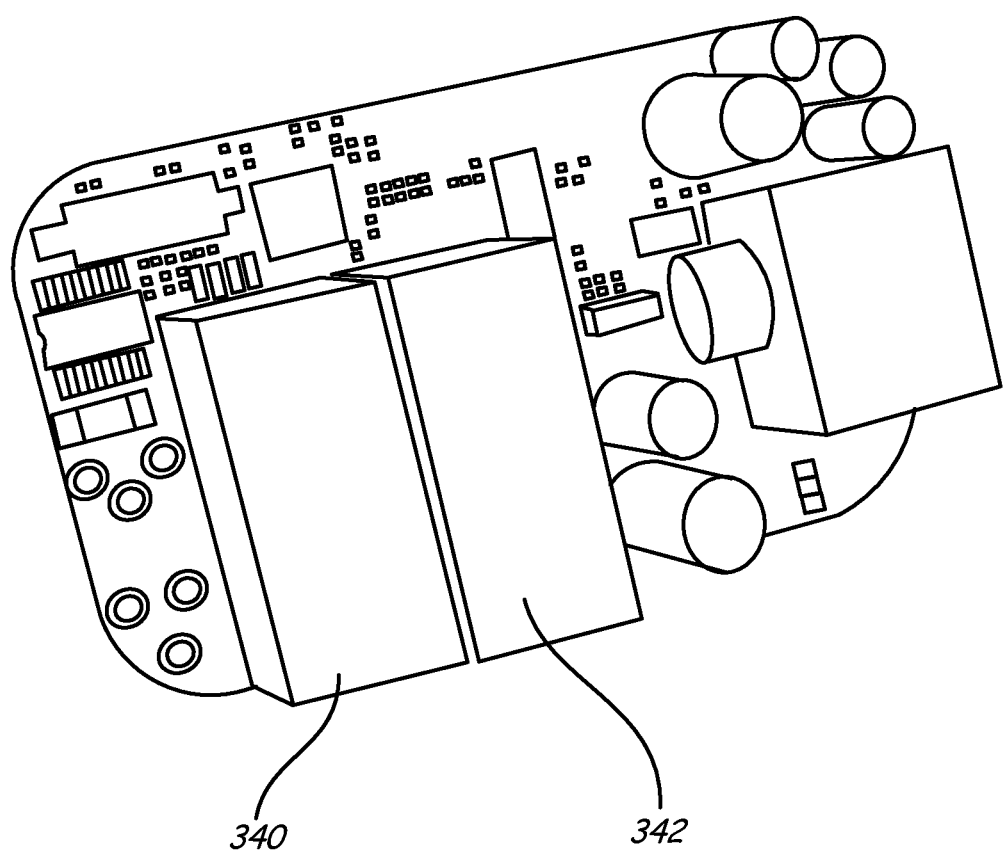
FIG. 39 shows a layout of an outlet board that may be used in accordance with the present invention.

The outlet board may be configured as an outlet that is controllable by a wireless interface. In one embodiment, the outlet is designed with the ZigBee controller. FIG. 39 depicts the outlet board; it has features including plug detection, energy metering, and ZigBee networking. The outlet board consists of five components: power supply, relays, a MCU, power metering ICs and a ZigBee communication chip. A component of the design is to have the device fit into a single gang outlet box, which is the standard size for in-wall solutions. The power supply delivers power to all components and is powered from the in-home 120V AC source.

Each outlet can be turned on or off individually through the relays 340, 342 shown in the outlet board of FIG. 39. The MCU is located above the relays and is the "brains" of this circuit, and controls the information flow on the board. The power metering ICs will monitor power consumption of the outlets, this is the information that will be fed back to the PIC32. The outlets have the ability to send data and create a mesh network through ZigBee, which also provides the connection to the display board. The ICs for the outlet board were chosen to have very low power consumption with energy efficiency in mind.

The following is a list of exemplary components and materials which may be used in constructing the various components of the present invention: 1) the for the load controller: cover and body, suitable PCBs, suitable terminal adapters, suitable connectors; for the personal interface display: body, cover and wall mounting, suitable PCB, suitable touch screen and screen protector, suitable connectors; for the outlet: sleeve or body and cover plate, bearing (main swivel part and plug face), suitable connectors, PCB, prong clips, spring, suitable LED's (for displaying detection, etc.), bearing holders, recentering frame and suitable terminals and connectors.

In some embodiments, the present invention comprises a permanent (in-wall outlet) electricity management system, one able to monitor and control power usage, and be automated and modified by a user. In some embodiments, this is realized by a system that uses a circuit in each outlet that communicates via ZigBee to a master control unit which in turn is controlled by a touch screen or through Wi-Fi with a computer or a smart phone. More particularly, the system will help to monitor power usage at the outlet and give the user the ability to turn on/off individual outlets or rooms/regions using a touch pad display or a through a wireless device. The user will also have the ability to monitor real time energy pricing with data from a web server and with this information will be able to make decisions about reducing energy use. Existing energy solutions may allow users to dim lights, close shades, and adjust thermostat, but do not include an in-wall outlet or permanent solution. There are other power management solutions that are addressing energy use at the outlet, such as plug-in adapters, e.g. P3 International Kill A Watt Electricity Usage Monitor, Belkin Conserve 3J, and other. However, these solutions are not permanent as they simply plug in, and it is necessary to buy one for each outlet where energy management is desired. Some only monitor the energy used and cannot be used to limit energy use.

In some embodiments, the permanent in-wall system in accordance with the present invention provides: safety through plug detection; security by being a permanent fixture and not a wall adapter; convenience and aesthetics through the GUI and fit in ware. Another feature not offered on standard outlets is plug detection, it requires a 3 prong plug to be inserted in the outlet before power will flow. Security is a nice feature as the plug-in adapters cost anywhere from $20 to $150 (in the P3 International family) and if stolen could be costly.

In some embodiments, the system will be controlled and monitored through either central hub, the LCD display controller, or through a wireless device. The overall design for the system can be seen in FIG. 1, the interconnection of the outlets is shown and demonstrates how they communicate in a mesh network through ZigBee and to the display controller. The display then connects through Wi-Fi to a wireless access point and from there to the internet and the data server.

In some embodiments, ZigBee communication technology is implemented to send data from between the outlets and to a controller board which interfaces through a touch pad display. The smart outlet in accordance with the present invention will be able to test and send information such as voltage, current, power usage, and be able to receive on and off commands. The display will act as the processing unit; functions include maintaining a user friendly GUI, receiving data from the outlet, displaying this data, receiving information from a web site, and acting on that data to send on/off commands to the outlets pre-specified by the user In some embodiments, outlet board design enables an outlet controllable by a wireless interface. In some embodiments, it has features including plug detection, energy metering, and ZigBee networking. The outlet board consists of five main components: power supply, relays, a MCU, power metering ICs and a ZigBee communication chip. One component of the design is to have the device fit into a single gang outlet box, which is the standard size for in-wall solutions. The power supply delivers power to all components and is powered from the in-home 120V AC source.

In some embodiments, with a number of ICs on the boards, programming will need to take into account each one individually. Several sub-routines will control the GUI, the wireless controller, and the ZigBee network. An interface for connecting to the wireless network is included, as well as functionality of commands received from the touch screen or wireless device.

The ZigBee CC2530 on the display board will take commands through a software UART to communicate with the PIC32. All programming may be done in C with many libraries available through the ZigBee website. The outlet ZigBee uses a hardware UART channel to communicate with the MSP430F MCU. Between the ZigBee units, RF communication is implemented. Wireless communication programming will be comprised of transceiver configurations which will be the drivers for the MRF24WB0MA, protocol configurations for the PIC32 TCP/IP stack, and application configurations for website or mobile device communication/interface. There may be timing difficulties when calling for data from both the ZigBee and Wi-Fi simultaneously, so the two will have to be alternatively activated as they communicate over the same frequency channel. A SPI bus is envisioned, where the peripheral devices are all controlled by the PIC32, and so the activation of individual devices must be done via software.

Embodiments of the present invention, including preferred embodiments, have been presented for the purpose of illustration and description. They are not intended to be exhaustive or to limit the invention to the precise forms and steps disclosed. The embodiments were chosen and described to illustrate the principles of the invention and the practical application thereof, and to enable one of ordinary skill in the art to utilize the invention in various embodiments and with various modifications as are suited to the particular use contemplated. For example, it should be appreciated any feature, embodiment, structure, operation, method and/or component of the present invention may be implemented separately or in combination with any other feature, embodiment, structure, operation, method and/or component. All such modifications and variations are within the scope of the invention as determined by the appended claims when interpreted in accordance with the breadth they are fairly, legally, and equitably entitled.

The invention claimed is:

1. A smart grid electrical management system comprising;
 a display controller for receiving user inputs and power data, for controlling the system and for outputting information;
 a power source;
 a load controller controlling electrical load on the system;
 a one or more outlets including at least one smart outlet connected in a mesh network, the smart controller comprising an integrated circuit; and
 a wired or wireless communication network linking the display controller, the load controller and the mesh network of one or more outlets, or the power source;
 the display controller sending and receiving signals over the wired or wireless communication network to and from the load controller, the mesh network, and the power source to turn on and off at least one of the outlets and to control electrical load.

2. The electrical management system of claim 1, wherein each of the at least one smart outlets comprises a touch screen graphical user interface (GUI) display controller.

3. The electrical management system of claim 2, wherein the smart outlet is adapted to fit in a typical gang box.

4. The electrical management system of claim 2, wherein the smart outlet comprises a plug receiving module adapted to swivel.

5. The electrical management system of claim 4, wherein the smart outlet is adapted to at least one of:
 detect and retain a plug;
 automatically respond to a change in electrical demand; and
 provide a standby mode.

6. The electrical management system of claim 1 wherein the at least one smart outlet comprises an on and off status indicator configured to send confirmation of status being changed.

7. The electrical management system of claim 1, wherein each of the at least one smart outlets comprises prong detectors and wherein if contact is not detected for both of a pair of prongs, the smart outlet shuts off.

8. The electrical management system of claim 1, wherein the at least one smart outlet is configured to turn off:
 by a user through an interface of the display controller;
 in response to sensed demand or a demand response;
 by a timer;
 in a group;
 in response to real-time pricing;
 due to standby reduction.

9. The electrical management system of claim 1, wherein the wired or wireless communication network links the display controller, the load controller and the mesh network, the power source, and the electrical appliances or devices.

10. The electrical management system of claim 1, wherein the load controller comprises a ZigBee enabled load controller.

11. The electrical management system of claim 1, wherein the smart outlet is configured to selectively turn off:
 by a user through an interface of the display controller;
 in response to sensed demand or a demand response;
 by a timer;
 in a group;
 in response to real-time pricing;
 due to standby reduction.

12. A smart grid electrical management system comprising;
 a display controller for receiving user inputs and power data, for controlling the system and for outputting information;
 a power source;
 a ZigBee enabled load controller controlling electrical load on the system;
 a one or more outlets including at least one smart outlet connected in a mesh network, the smart controller comprising an integrated circuit, wherein the smart outlet is adapted to:
 detect and retain a plug,
 automatically respond to a change in electrical demand, and
 provide a standby mode; and
 a wired or wireless communication network linking the display controller, the load controller and the mesh network of one or more outlets, the power source and electrical appliances or devices;
 the display controller sending and receiving signals over the wired or wireless communication network to and from the ZigBee enabled load controller, the mesh network, and the power source to turn on and off at least one of the outlets and to control electrical load.

* * * * *